(12) United States Patent
Bishop et al.

(10) Patent No.: US 11,953,750 B2
(45) Date of Patent: Apr. 9, 2024

(54) INTERLOCKING FIBER OPTIC CONNECTOR HOLDER

(71) Applicant: CommScope Technologies LLC, Hickory, NC (US)

(72) Inventors: Erik David Bishop, Fuquay-Varina, NC (US); Harry L Vaswani, Garner, NC (US)

(73) Assignee: CommScope Technologies LLC, Hickory, NC (US)

( * ) Notice: Subject to any disclaimer, the term of this patent is extended or adjusted under 35 U.S.C. 154(b) by 91 days.

(21) Appl. No.: 17/245,950

(22) Filed: Apr. 30, 2021

(65) Prior Publication Data

US 2021/0341699 A1    Nov. 4, 2021

Related U.S. Application Data

(60) Provisional application No. 63/168,409, filed on Mar. 31, 2021, provisional application No. 63/018,073, filed on Apr. 30, 2020.

(51) Int. Cl.
| | |
|---|---|
| *G02B 6/00* | (2006.01) |
| *G02B 6/38* | (2006.01) |
| *G02B 6/44* | (2006.01) |

(52) U.S. Cl.
CPC ......... *G02B 6/4471* (2013.01); *G02B 6/3825* (2013.01)

(58) Field of Classification Search
CPC .. G02B 6/4471; G02B 6/3825; G02B 6/3849; G02B 6/3897; G02B 6/00
See application file for complete search history.

(56) References Cited

U.S. PATENT DOCUMENTS

| | | | |
|---|---|---|---|
| 6,267,606 B1 * | 7/2001 | Poplawski | G02B 6/4277 |
| | | | 361/752 |
| 6,579,014 B2 | 6/2003 | Melton et al. | |
| 6,648,520 B2 | 11/2003 | McDonald et al. | |
| 6,899,467 B2 | 5/2005 | McDonald et al. | |
| 7,120,347 B2 | 10/2006 | Blackwell, Jr. et al. | |
| 7,239,789 B2 | 7/2007 | Grubish et al. | |
| 7,292,763 B2 | 11/2007 | Mertesdorf et al. | |

(Continued)

FOREIGN PATENT DOCUMENTS

| | | |
|---|---|---|
| WO | 2008/118603 A2 | 10/2008 |
| WO | 2017/162751 A1 | 9/2017 |

(Continued)

OTHER PUBLICATIONS

International Search Report and Written Opinion of the International Searching Authority for International Patent Application No. PCT/US2018/047746 dated Dec. 14, 2018, 13 pages.

(Continued)

*Primary Examiner* — Jennifer Doan
(74) *Attorney, Agent, or Firm* — MERCHANT & GOULD P.CO.

(57) ABSTRACT

The present disclosure relates to individual parking units or connector holders that have an interlock interface on each side thereof that tallow the connector holders to be directly connected together in a ganged relationship. The connector holders can include a detachable connection at a front end thereof to removable mount over a post to form a frictional engagement therewith. The post can be configured to attach to another structure with the connector holders.

8 Claims, 24 Drawing Sheets

(56) References Cited

U.S. PATENT DOCUMENTS

| | | | |
|---|---|---|---|
| 7,397,997 B2 | 7/2008 | Ferris et al. | |
| 7,457,503 B2 * | 11/2008 | Solheid | G02B 6/4471 |
| | | | 385/135 |
| 7,480,437 B2 | 1/2009 | Ferris et al. | |
| 7,489,849 B2 | 2/2009 | Reagan et al. | |
| 7,512,304 B2 | 3/2009 | Gronvall et al. | |
| 7,653,282 B2 | 1/2010 | Blackwell, Jr. et al. | |
| 7,680,388 B2 | 3/2010 | Reagan et al. | |
| 7,844,158 B2 | 11/2010 | Gronvall et al. | |
| 7,903,923 B2 | 3/2011 | Gronvall et al. | |
| 7,941,027 B2 | 5/2011 | Mertesdorf et al. | |
| 9,400,363 B2 | 7/2016 | Coenegracht et al. | |
| 10,274,686 B2 | 4/2019 | Smith et al. | |
| 10,469,175 B2 * | 11/2019 | Jachetta | G02B 6/4261 |
| 11,092,765 B2 | 8/2021 | Cams et al. | |
| 2005/0213921 A1 | 9/2005 | Mertesdorf et al. | |
| 2006/0098932 A1 | 5/2006 | Battey et al. | |
| 2006/0153517 A1 | 7/2006 | Reagan et al. | |
| 2006/0283619 A1 | 12/2006 | Kowalczyk et al. | |
| 2007/0025674 A1 | 2/2007 | Kowalczyk et al. | |
| 2009/0148118 A1 | 6/2009 | Gronvall et al. | |
| 2011/0097050 A1 | 4/2011 | Blackwell, Jr et al. | |
| 2012/0237173 A1 | 9/2012 | Alston et al. | |
| 2013/0251325 A1 | 9/2013 | Solheid et al. | |
| 2017/0168256 A1 | 6/2017 | Reagan et al. | |
| 2019/0170961 A1 * | 6/2019 | Coenegracht | G02B 6/4444 |
| 2019/0302367 A1 | 10/2019 | Van Baelen | |

FOREIGN PATENT DOCUMENTS

| | | |
|---|---|---|
| WO | 2019/040742 A1 | 2/2019 |
| WO | 2019/195602 A1 | 10/2019 |
| WO | 2020/180619 A1 | 9/2020 |
| WO | 2020/180714 A1 | 9/2020 |
| WO | 2020/205313 A1 | 10/2020 |
| WO | 2021/026486 A1 | 2/2021 |

OTHER PUBLICATIONS

Extended European Search Report for European Patent Application No. 18848029.7 dated Mar. 31, 2021, 8 pages.

* cited by examiner

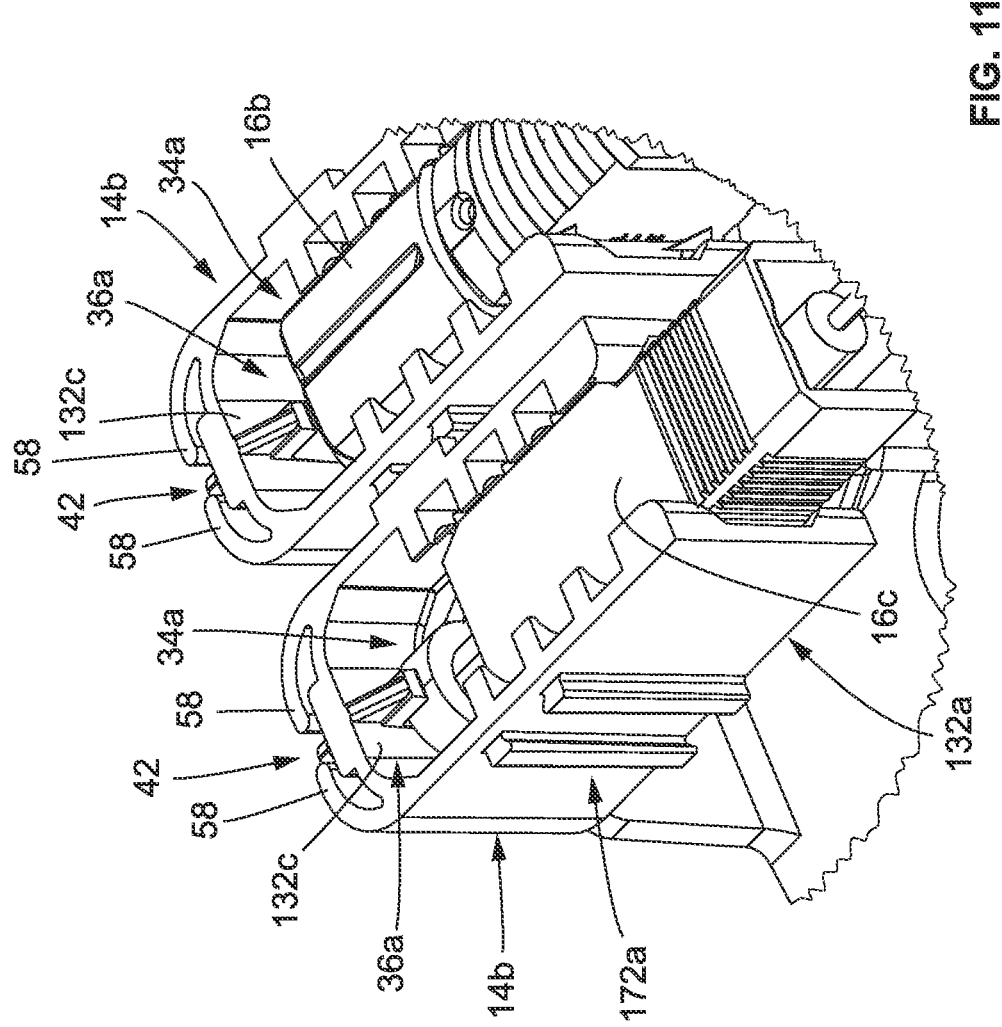

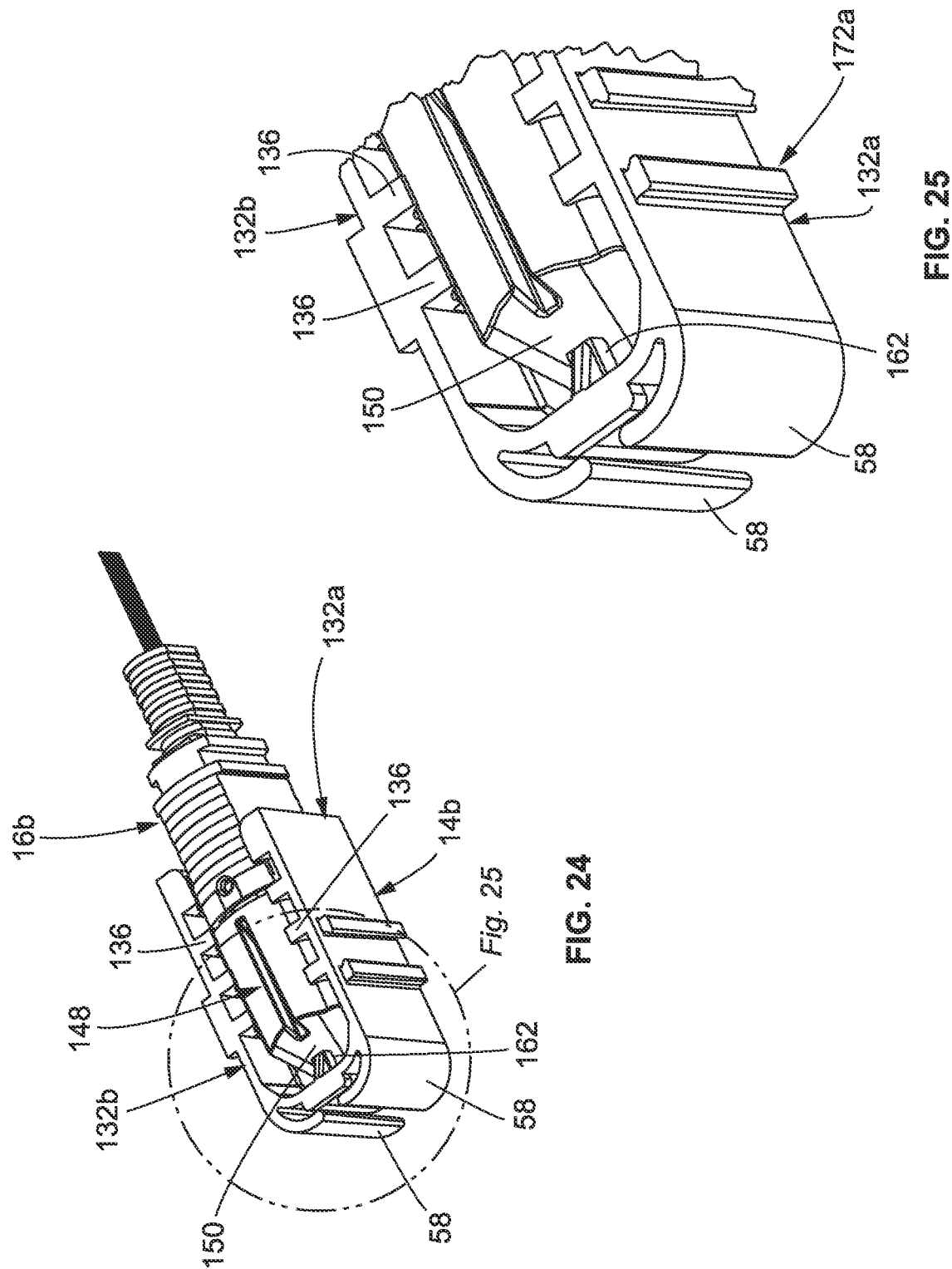

INTERLOCKING FIBER OPTIC CONNECTOR HOLDER

CROSS-REFERENCE TO RELATED APPLICATIONS

This application claims the benefit of U.S. Provisional Application Ser. No. 63/168,409, filed Mar. 31, 2021; and 63/018,073, filed Apr. 30, 2020, the disclosures of which are hereby incorporated by reference in their entireties.

TECHNICAL FIELD

The present disclosure relates generally to telecommunications management devices. More specifically, the present disclosure relates to fiber optic connector holders mountable on a tray or other structure.

BACKGROUND

Trays are commonly used to manage, store and protect optical fibers and optical splices. Typically, these trays are relatively hard, plastic constructions and include added structures for routing optical fibers and splicing locations. Fiber optic connectors are sometimes mounted on trays using parking devices or connector holders. Each of the connectors are inserted within a parking device or connector holder for storage and protection until the connectors are accessed at a later time or date. Example parking devices or connector holders are described in U.S. Pat. No. 10,274,686 and International Publication No. WO 2019/040742A1.

SUMMARY

Aspects of the present disclosure relate to individual connector holders (e.g., individual parking units) that are configured for receiving and mounting a fiber optic connector. The individual connector holders can be mounted on a management tray usable in a multi-service terminal (MST).

One aspect of the present disclosure relates to connector holders that have an interlock interface on opposing sides thereof. The interlock interfaces allow a plurality of individual connector holders to be directly coupled together in a chain or side-by-side arrangement.

In certain examples, the connector holder can include a housing with a plurality of walls that together define a receptacle for receiving a fiber optic connector. The receptacle can have a closed end and an opposite, open end.

Another aspect of the present disclosure relates to a connector holder that includes a retaining member for detachably engaging a post. In certain examples, the retaining member is positioned at the closed end of the receptacle. The retaining member can be adapted to mate with a coupling member of the post. The post including the connector holder can be attached to another structure.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 11 is a perspective view of another example connector holder configured and both SC and MPO type connectors mounted within the connector holder in accordance with the principles of the present disclosure.

FIG. 24 is a perspective view showing the MPO type connector mounted in the connector holder in accordance with the principles of the present disclosure.

FIG. 25 is an enlarged view of a portion the MPO type connector mounted in the connector holder of FIG. 24.

DETAILED DESCRIPTION

The present disclosure is directed to individual connector holders (e.g., parking units) that include interlocking interfaces on opposite sides thereof to allow the individual connector holders to be directly connected together in a ganged relationship (i.e., chained, side-by-side relationship). The individual connector holders are each configured for receiving only a single fiber optic connector. The connections between the connector holders are preferably detachable.

In certain examples, the connector holders are capable of receiving a fiber optic connector with a dust cap positioned over a ferrule of the fiber optic connecter. Alternatively, the connector holders may be configured as a dust cap. That is, the connector holders may each include an integral feature that can fit over the ferrule of the fiber optic connector to protect the ferrule from dirt, debris or other contaminants. Non-limiting examples of fiber optic connectors include MPO style connectors, and single or duplex fiber connectors, such as LC or SC type connectors.

A connector holder or a chain of directly coupled connector holders can be mounted on a management tray via a post to organize and guide optical fibers. The management tray can be arranged and configured for use within a drop terminal (e.g., multi-service terminal). The connector holders can be removably connected to the post via a detachable connection. In one example, the detachable connection is frictional. That is, the detachable connection can be configured such that the connector holder is frictionally engaged with the post when mounted thereon. In other connection arrangements, a snap-fit detachable connection can be used.

Figure 1:
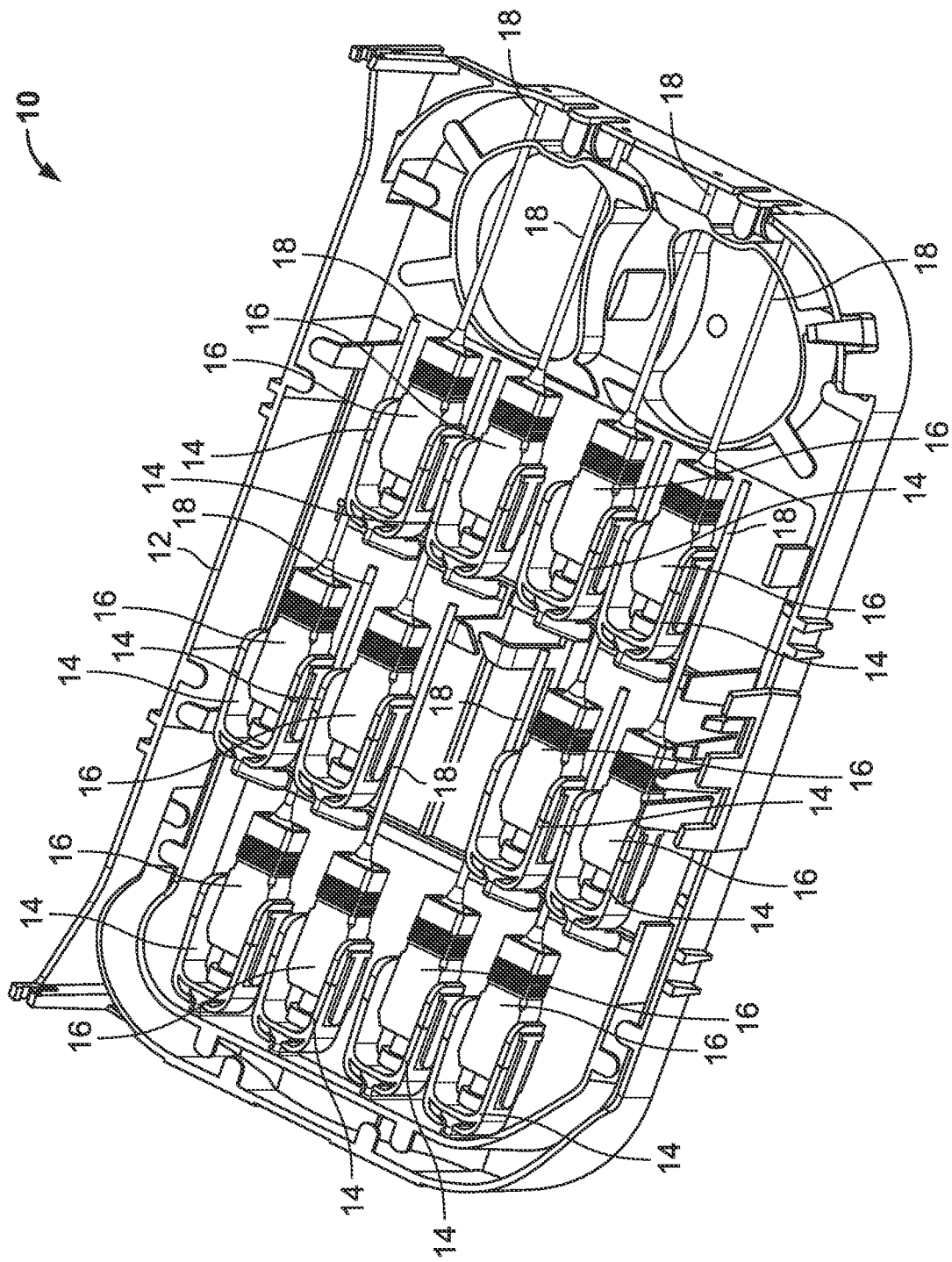
FIG. 1 is a perspective view of an example tray assembly including a plurality of connector holders mounted thereon and fiber optic connectors mounted within the connector holders in accordance with principles of the present disclosure.

FIG. 1 illustrates an example tray assembly 10. The tray assembly 10 includes a fiber management tray 12 and a plurality of connector holders 14 mounted on the fiber management tray 12. It will be appreciated that the connector holders 14 can be used with any number of different types of telecommunications equipment such as trays, panels, racks, enclosures, hubs, frames or the like.

Each of the plurality of connector holders 14 is configured to receive only a single fiber optic connector 16. The fiber management tray 12 aids in guiding and managing optical fibers 18. That is, the fiber management tray 12 allows optical fibers to be pre-routed on the fiber management tray 12 prior to installing the fiber management tray 21 in a drop terminal. The fiber optic connector 16 shown is a SC type connector and the connector holder 14 is a SC style holder, although alternatives are possible. In certain examples, the fiber optic connector may include a LC type connector. In certain examples, the fiber optic connector may be a MPO type connector and the connector housing may be a MPO style holder (see FIG. 10).

Figure 2:
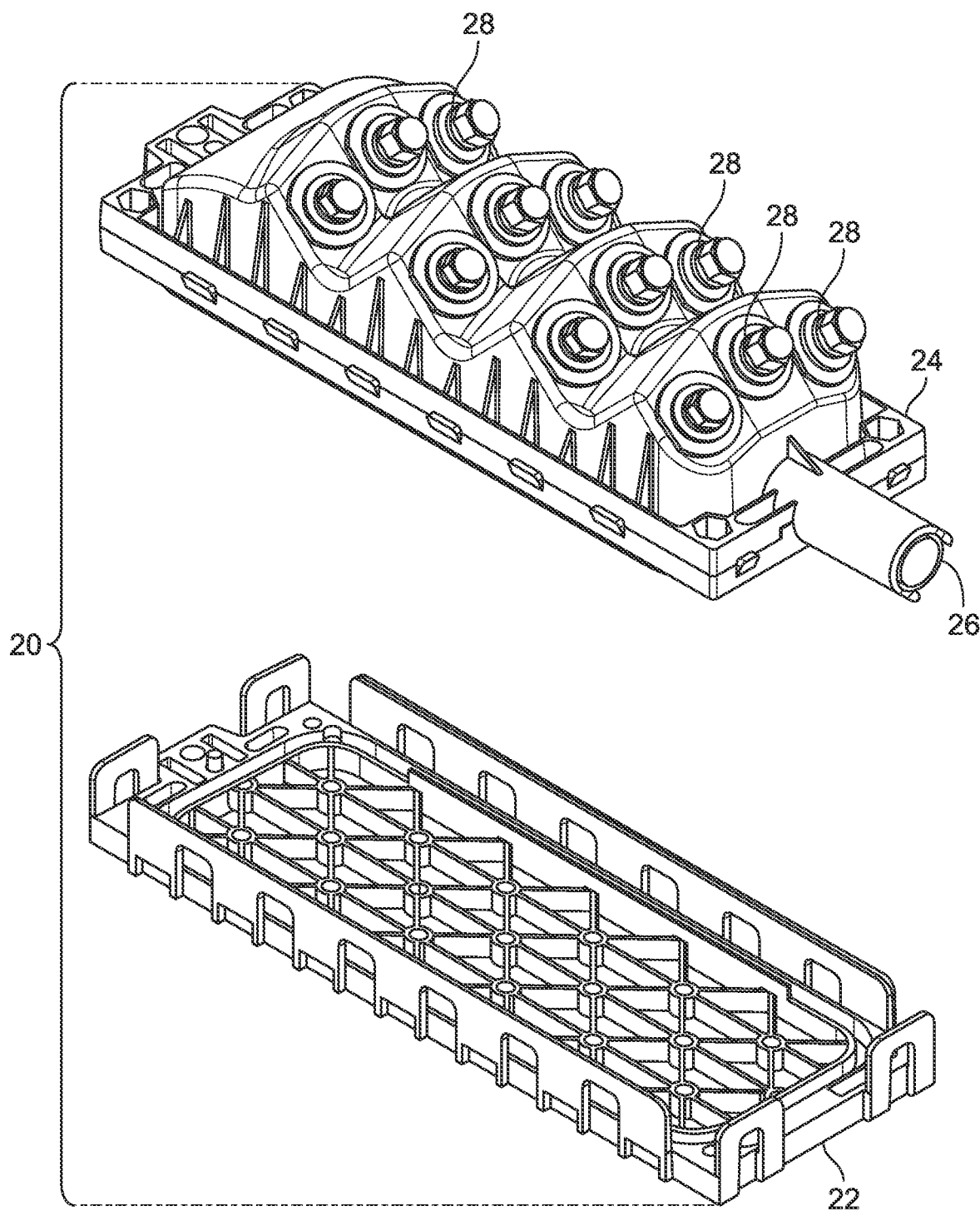
FIG. 2 is a perspective view of an example drop terminal including a base exploded away from a cover.

FIG. 2 illustrates an example multi-service terminal (MST) 20 (e.g., drop terminal) within which the fiber management tray 12 may be disposed. The multi-service terminal 20 may include a housing that defines an interior that is environmentally sealed from an exterior of the MST 20.

The MST 20 includes a base 22 and a cover 24 that couple together to define the interior. The housing includes an input 26 and a plurality of outputs 28. In certain types of MSTs, multi inputs may be included. A fiber optic input cable having one or more optical fibers can be received at the input 26. In certain examples, the cover 24 carries the outputs 28. In certain examples, the cover 24 defines the input 26. In other examples, the base 22 defines the input 26, or the base 22 and the cover 24 cooperate to define the input 26. In certain examples, the outputs 28 include optical adapters (preferably ruggedized optical adapters). The adapter can be single-fiber (preferably ruggedized) optical adapters and/or multi-fiber (preferably ruggedized) optical adapters.

Figure 3:
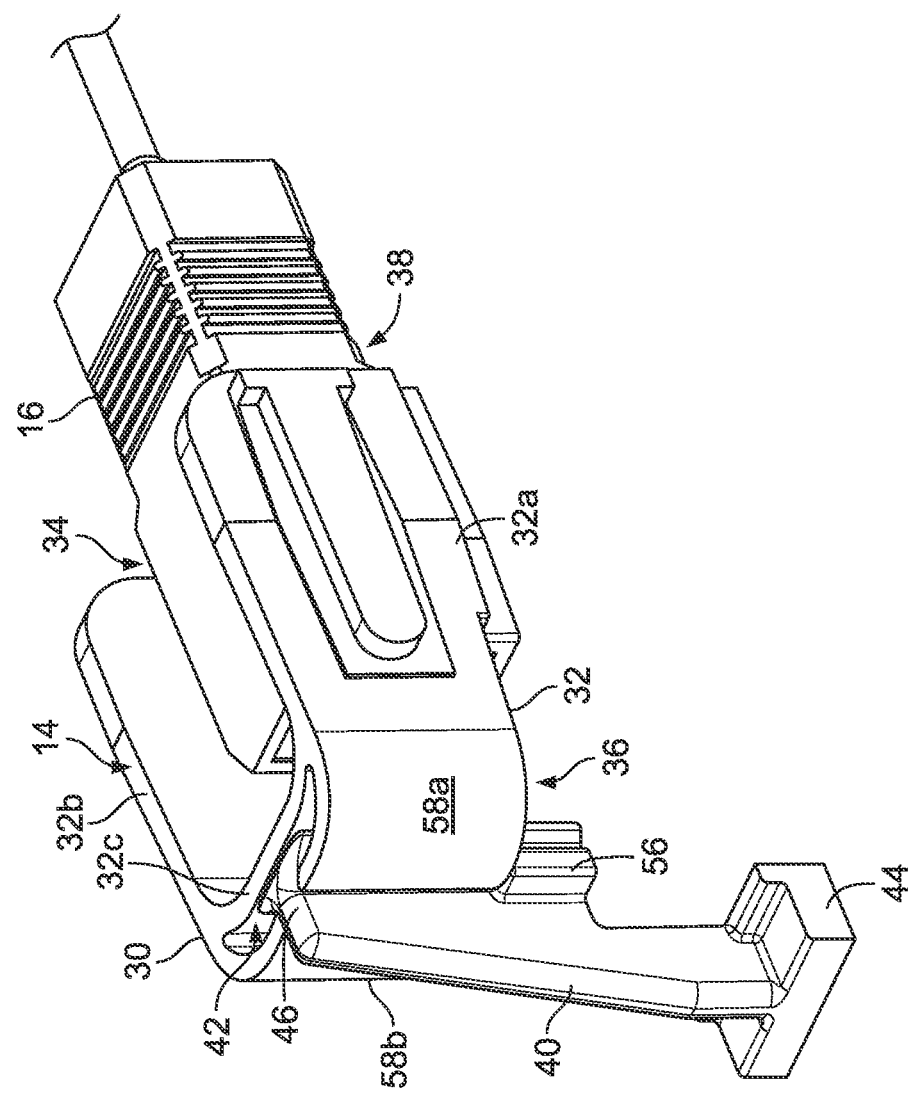
FIG. 3 is a perspective view of the connector holder of FIG. 1 shown mounted to a post in accordance with the principles of the present disclosure.

Turning to FIG. 3, the connector holder 14 is shown removed from the fiber management tray 12. The connector holder 14 includes a housing 30 with a plurality of walls 32 that define a receptacle 34 for receiving the fiber optic connector 16. The receptacle 34 may have a closed end 36 and an opposite, open end 38 such that the fiber optic connector 16 is inserted into the receptacle 34 from the open end 38. The plurality of walls 32 may include a first side wall 32a, a second side wall 32b, and an end wall 32c. The end wall 32c may extend between the first and second side walls 32a, 32b to form the closed end 36 of the receptacle 34.

Still referring to FIG. 3, the connector holder 14 is shown attached to a mounting structure 40 (e.g., a post) by a coupling arrangement 42 (e.g., coupler, coupling feature). The coupling arrangement 42 is provided for releasably connecting the connector holder 14 to the mounting structure 40.

The mounting structure 40 includes a base end 44 and a support end 46. The base end 44 of the mounting structure 40 is configured to mount to any structure, such as, a tray, a panel, or a cabinet, etc. In certain examples, the base end 44 is adapted to be integrated with a structure. In other examples, the base end 44 can include a feature that interlocks with another structure or attaches via a snap-fit connection, although alternatives are possible. The mounting structure 40 allows the connector holder 14 to be detachable from the fiber management tray 12.

While in use, the connector holder 14 holds the fiber optic connector 16 in staged locations on the fiber management tray 12 such that the fiber optic connectors 16 will align with the outputs 28 or optical adapters of the MST 20 when the fiber management tray 12 is disposed between the base 22 and the cover 24. Once the fiber optic connector 16 is pulled out of the connector holder 14 and plugged into the output 28 of the MST 20, the connector holder 14 can be detached from the fiber management tray 12 such that the empty connector holder 14 does to not continue to occupy space on the fiber management tray 12. It will be appreciated that the connector holder 14 may be reused to mount another fiber optic connector 16 on the fiber management tray 12.

Figure 4:
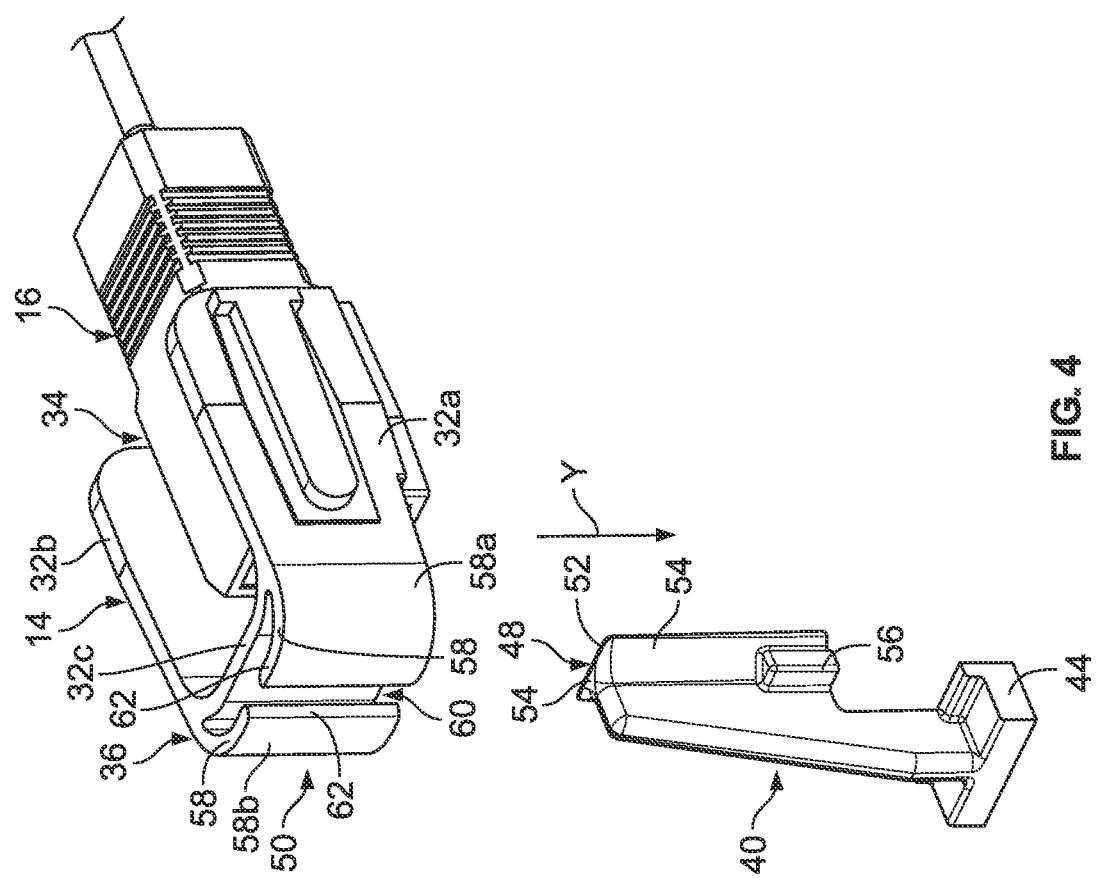
FIG. 4 is a perspective view showing the connector holder of FIG. 3 detached from the post.

FIG. 4 illustrates the connector holder 14 separated from the mounting structure 40. The coupling arrangement 42 provides a detachable interlocking connection between the connector holder 14 and the mounting structure 40. The coupling arrangement 42 can include a coupler corresponding to the connector holder 14 and a coupling feature corresponding to the mounting structure 40.

In certain examples, the detachable interlocking connection is a slidable detachable interlocking connection. In certain examples, the slidable detachable interlocking connection includes a tongue and groove type of connection. In certain examples, the tongue and groove forms a dovetail connection. In certain examples, the detachable interlocking connection is a snap-fit connection. It will be appreciated that the coupling arrangement 42 in the form of a detachable interlocking connection may be configured in a variety of different configurations as long as it allows the connector holder 14 to be removably coupled to the mounting structure 40.

In the depicted example, the coupling arrangement 42 includes intermating dovetail features between the connector holder 14 and the mounting structure 40. A dovetail structure 48 in the form of a male feature is provided on the mounting structure 40 and a mating dovetail receiver 50 in the form of a female feature is provided at the closed end 36 (e.g., a front end) of the receptacle 34. The dovetail structure 48 is capable of being received within the dovetail receiver 50 when the coupling arrangement 42 is being connected to provide a dovetail connection between the connector holder 14 and the mounting structure 40.

The dovetail structure 48 includes a longitudinal tongue 52 with a pair of angled or sloped surfaces 54 that form a dovetail shape, thereby enabling the dovetail structure 48 to form a connection with the dovetail receiver 50. The mounting structure 40 includes a stop 56 adjacent the angled or sloped surface 54 that limits the amount of movement between the connector holder 14 and the mounting structure 40. The longitudinal tongue 52 is adapted to slide freely within the dovetail receiver 50 until the connector holder 14 bottoms out at the stop 56. That is, the connector holder 14 engages the stop 56 when the connector holder 14 reaches its seated position on the mounting structure 40.

Figure 5:
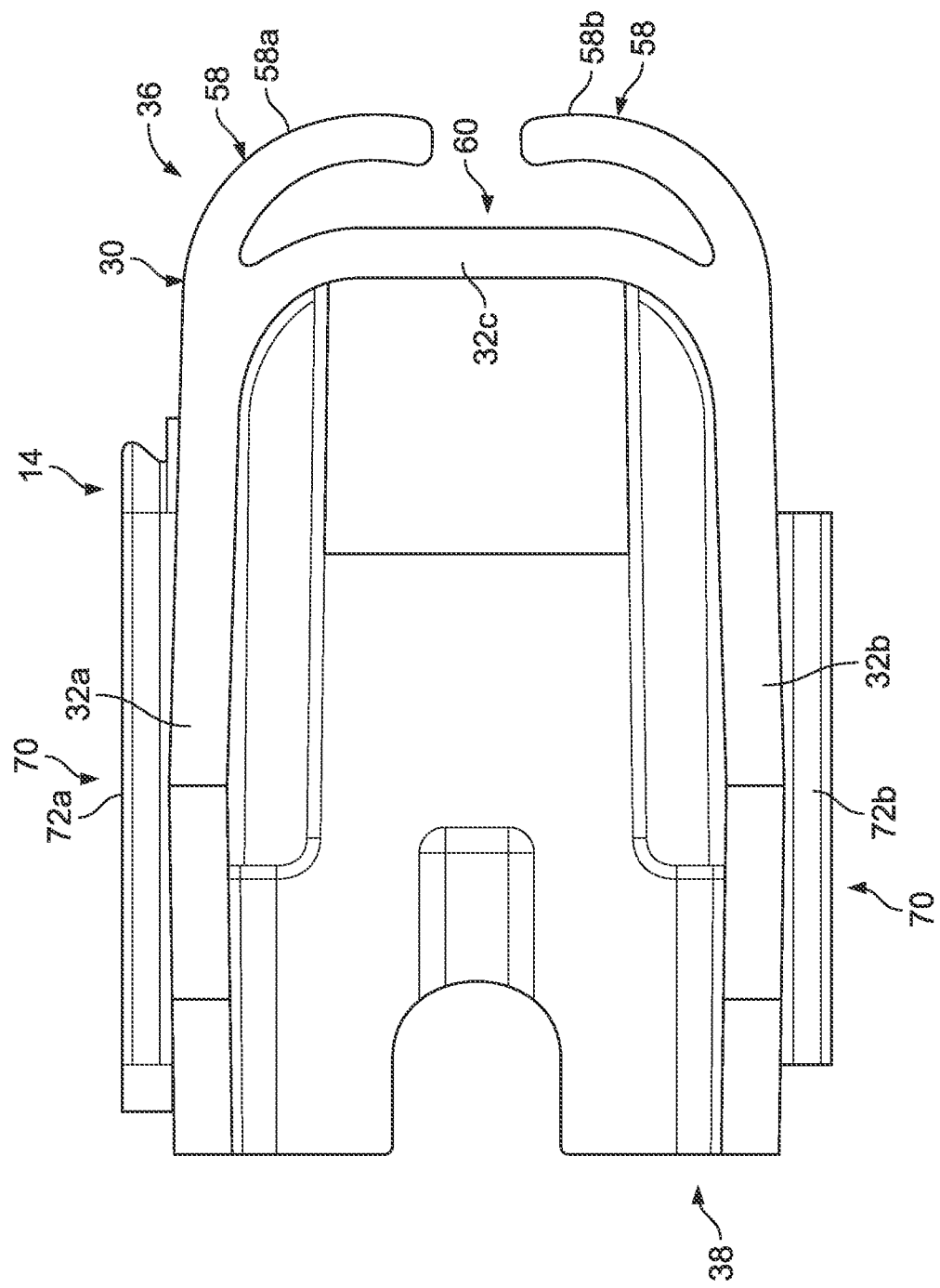
FIG. 5 is a top view of the connector holder of FIG. 4.

Referring to FIG. 5, the dovetail receiver 50 of the connector holder 14 is sized and shaped to mate snugly with the dovetail structure 48 of the mounting structure 40 when the connector holder 14 is mounted to the mounting structure 40. In certain examples, the dovetail receiver 50 can include opposing flexible, resilient tabs 58 (e.g., wings, flaps) that define a groove 60. In certain examples, the resilient tabs 58 can be configured as outer flaps for detachably engaging mounting structure 40.

In certain examples, the flexible tabs 58a can include a first flexible tab 58a that is integrated with the first side wall 32a and a second flexible tab 58b that is integrated with the second side wall 32b, although alternatives are possible. The first and second flexible tabs 58a, 58b can bend inwardly from perspective first and second side walls 32a, 32b. That is, the first and second flexible tabs 58a, 58b can be oriented in opposite directions with a free end 62 of the first flexible tab 58a opposing a free end 62 of the second flexible tab 58b as the first and second flexible tabs 58a, 58b are generally curved about and offset from the end wall 32c at the closed end 36 of the receptacle 34 to form a flexible resilient connection.

The connector holder 14 can be moved in a longitudinal direction Y to mount to the mounting structure 40 such that the longitudinal tongue 52 is received in the groove 60. In one example, the movement is reversed for removal of the connector holder 14 from the mounting structure 40.

The end faces 62 of the flexible, resilient tabs 58 are adapted to frictionally engage the angled or sloped surfaces 54 of the longitudinal tongue 52 to prevent the connector holder 14 from sliding off the mounting structure 40. The end wall 32c and mating flat surface of the longitudinal tongue 52 can help to restrict rotation of the connector holder 14 on the mounting structure 40. That is, the connector holder 14 does not twist or rotate about the longitudinal tongue 52. In certain examples, the flexible, resilient tabs 58 can be snap-fitted into engagement with the mounting structure 40.

Figure 6:
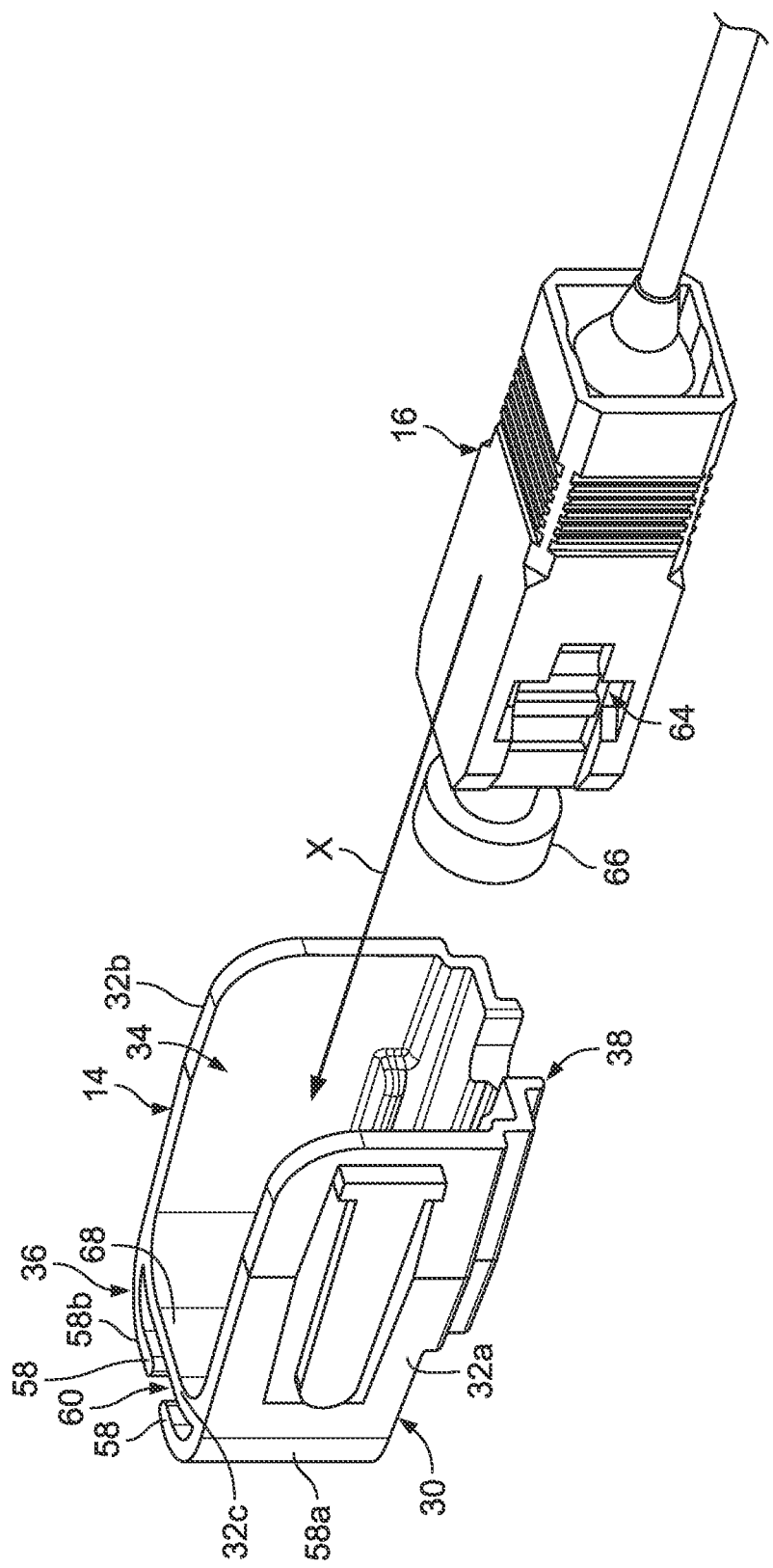
FIG. 6 is a perspective view showing a fiber optic connector prior to insertion into the connector holder of FIG. 4.
Figure 7:
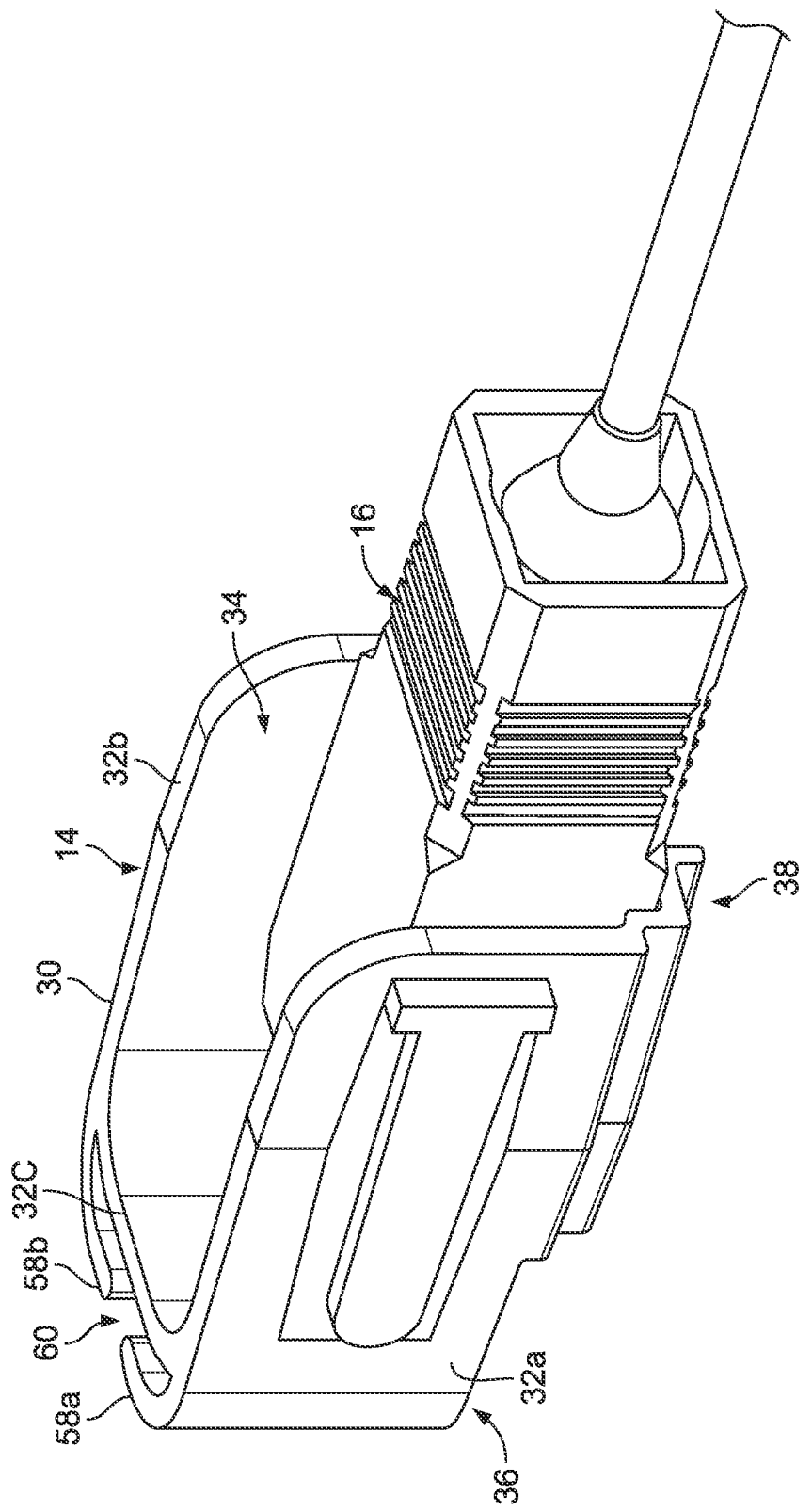
FIG. 7 is a perspective view showing the fiber optic connector mounted in the connector holder of FIG. 6.

Turning to FIG. 6, the fiber optic connector 16 is shown prior to insertion into the connector holder 14. The fiber optic connector 16 can be moved along a direction X until inserted into the receptacle 34 as shown in FIG. 7 to be temporarily held therein. The direction X is perpendicular to the direction Y.

The receptacle 34 of the connector holder 14 can include a retention feature for temporarily holding the fiber optic connector 16 within the receptacle 34. In certain examples, the retention feature provides a friction fit connection for holding the fiber optic connector 16 within the receptacle 34. In certain examples, the retention feature may include a latch arrangement that provides a snap-fit connection for holding the fiber optic connector 16 within the receptacle 34. That is, the latch arrangement can be configured to engage latch receptacles 64 on opposing sides of the fiber optic connector 16.

In certain examples, the receptacle 34 of the connector holder 14 is capable of receiving and holding the fiber optic connector 16 while a dust cap 66 is mounted over a ferrule of the fiber optic connector 16. In certain examples, when the fiber optic connector 16 is mounted in the receptacle 34, the dust cap 66 may be offset from the closed end 36 of the receptacle. In certain examples, when the fiber optic connector 16 is mounted in the receptacle 34, the dust cap 66 may abut the closed end 36 of the receptacle 34.

Alternatively, the receptacle 34 of the connector holder 14 can have an integrated feature that allows the connector holders 14 to act as a dust cap such that a separate dust cap is not needed. The integrated feature may be positioned in the connector holder 14 such that a ferrule of the fiber optic connector 16 fits inside the integrated feature. That is, the integrated feature is adapted to mount or snap over a ferrule of the fiber optic connector 16. In certain examples, the integrated feature may be configured as a plug on an interior surface 68 of the end wall 32c of the housing 30. In certain examples, the integrated feature may be a recess for receiving an end face of a ferrule. The recess can be defined in the end wall 32c of the housing 30.

Turning again to FIG. 5, the connector holder 14 can include an interlock interface 70 on opposing first and second side walls 32a, 32b of the housing 30. The interlock interface 70 is configured for directly coupling a plurality of housings 30 together in a chain or side-by-side arrangement. That is, the interlock interface 70 can allow a plurality of housings 30 to be mounted in a row in a ganged relationship.

Figure 8:
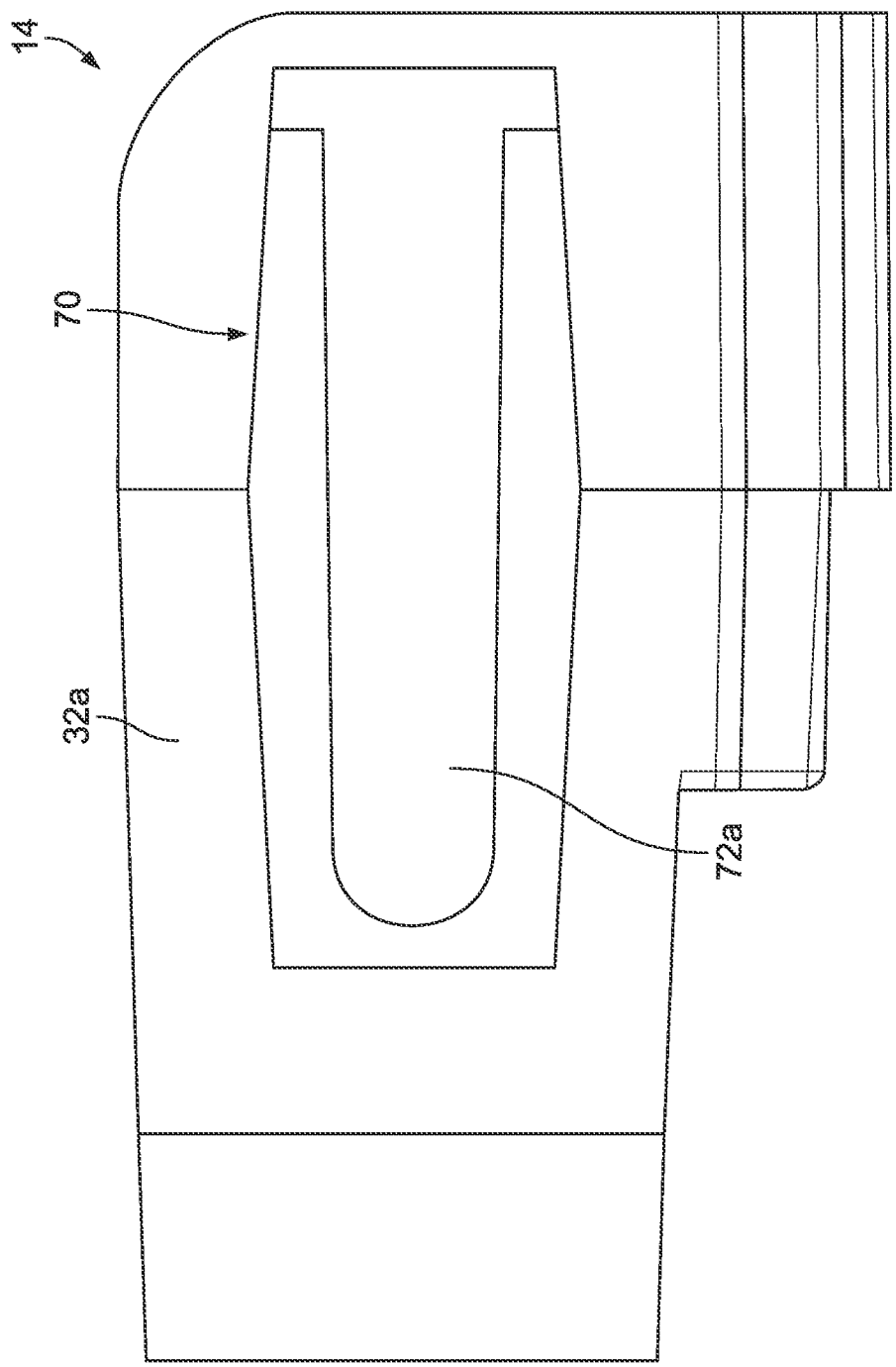
FIG. 8 is a side view of the connector holder of FIG. 5.
Figure 9:
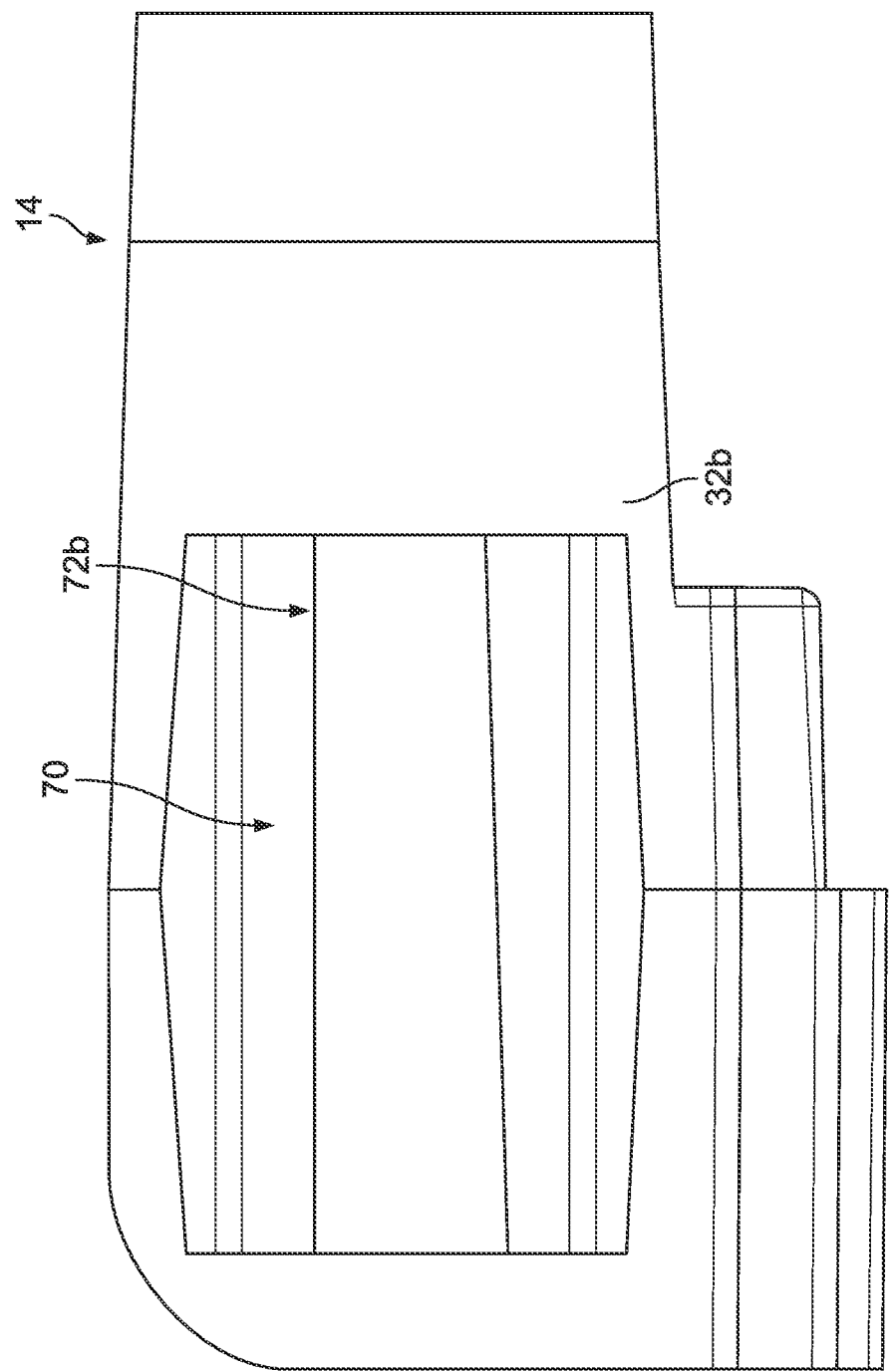
FIG. 9 is an opposite side view of the connector holder of FIG. 8.

Turning to FIGS. 8 and 9, the interlock interface 70 can include a different type of engagement structure 72a, 72b on respective first and second side walls 32a, 32b of the housing 30. In certain examples, the engagement structures 72a, 72b may include different types of latches on each side of the housing 30. In certain examples, the first and second side walls 32a, 32b of the housing 30 can each include one of a tongue portion that corresponds to a male feature and a groove portion that corresponds to a female feature. In certain examples, the tongue portion includes a dovetail tongue portion and the groove portion includes a dovetail groove portion.

When a plurality of connector holders 14 are directly coupled together in a side-by-side relationship, one of a dovetail tongue portion and dovetail groove portion is coupled to a mating one of a dovetail tongue portion and dovetail groove portion of an adjoining side of an adjacently disposed connector holder 14 to establish a dovetail connection therebetween. That is, the groove portion can receive the tongue portion of an adjacent connector holder 14 to directly couple the connector holders 14 with an adjacent connector holder 14.

In certain examples, the engagement structures 72a 72b allow adjacent connector holders 14 to be directly coupled together in a side-by-side arrangement on the fiber management tray 12. In certain examples, the engagement structures 72a 72b may be integrated with the housing 30, although alternatives are possible. In certain examples, the engagement structures 72a 72b may be coupled with the housing 30.

Figure 10:
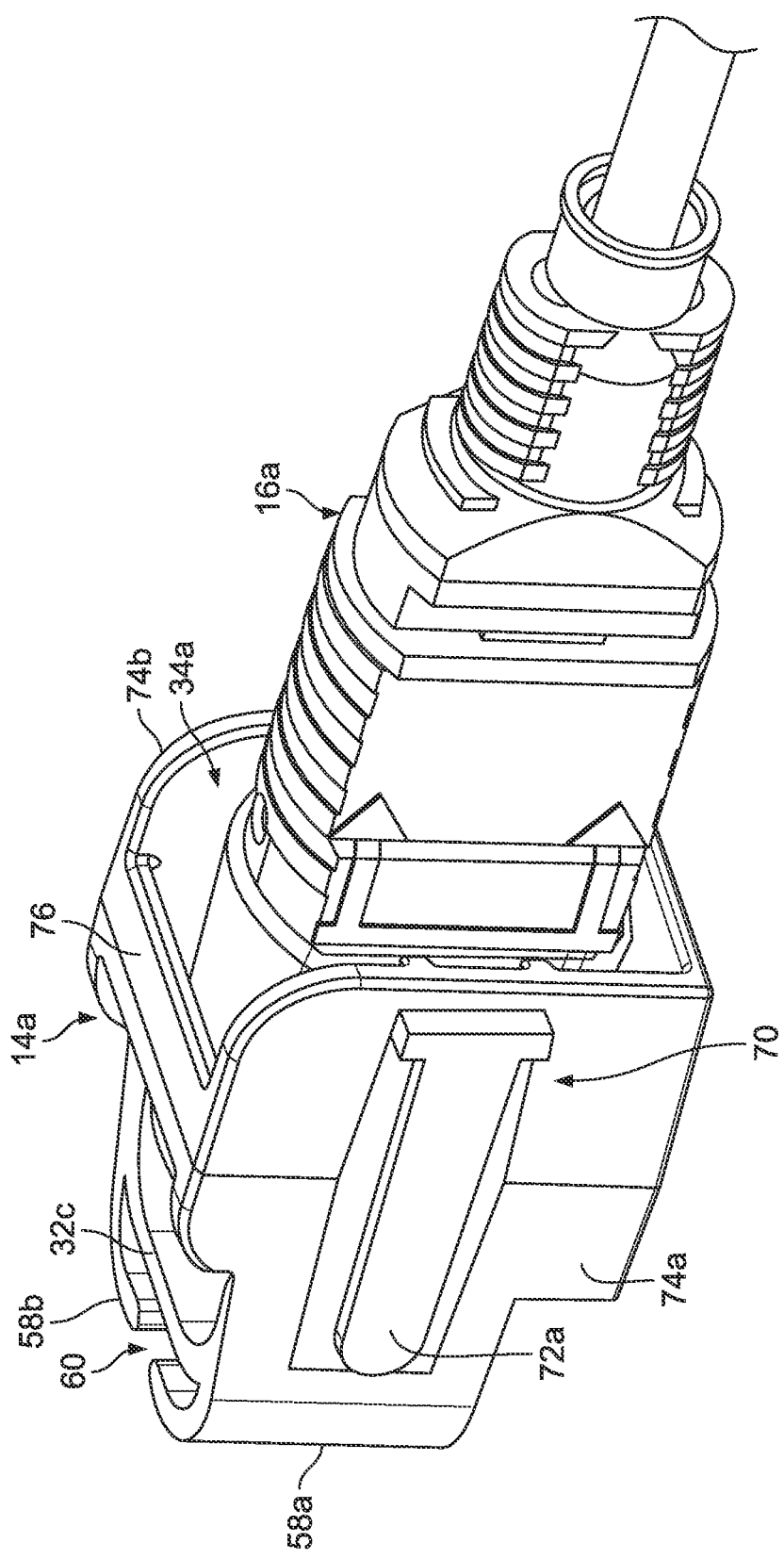
FIG. 10 is a perspective view of another example connector holder in accordance with the principles of the present disclosure.

Turning to FIG. 10, another example connector holder 14a is depicted in accordance with the principles of the present disclosure. The connector holder 14a is a MPO style holder shown with a MPO type connector 16a mounted therein. Unless stated otherwise, the features of the connector holder 14a are similar to the other connector holder 14. That is, the connector holder 14a can include the coupling arrangement 42 that provides a detachable interlocking connection between the connector holder 14a and the mounting structure 40. In addition, the connector holder 14a can include the interlock interface 70 for directly coupling a plurality of housings 30a of the connector holder 14a together in a chain or side-by-side arrangement. For the sake of brevity, only those portions that differ from the connector holder 14 illustrated in FIGS. 1-9 discussed above will be described in detail.

The connector holder 14a includes a receptacle 34a that is sized to frictionally engage and hold a MPO style connector. In certain examples, first and second side walls 74a, 74b of the connector holder 14a may have height that is greater than the first and second side walls 32a, 32b of the connector holder 14 illustrated in FIGS. 1-9. In certain examples, the width of the connector holder 14a may be narrower than the connector holder 14 to accommodate the MPO style connector.

The connector holder 14a may include a cross bar 76 to help prevent the MPO style fiber optic connector 16a from being removed from the receptacle 34a. That is, when the MPO style fiber optic connector 16a is inserted underneath the crossbar 76, the crossbar 76 of the connector holder 14a may add retention to help hold the MPO style fiber optic connector 16a within the receptacle 34a of the connector holder 14a.

The connector holder 14a includes the engagement structures 72a 72b to allow adjacent connector holders 14a to be directly coupled together in a side-by-side arrangement on the fiber management tray 12 similar to the connector holder 14 of FIGS. 1-9. It will be appreciated that connector holders corresponding to different types of fiber optic connectors may be chained together.

In certain examples, the connector holder 14 may be connected and chained together in a side-by-side relationship with the connector holder 14a. That is, the engagement structures 72a, 72b of the connector holder 14a can be respectively mated with another one of the engagement structures 72a, 72b of the connector holder 14. As such, both the SC style fiber optic connector 16 and the MPO style fiber optic connector 16a can be mounted together on a structure such as the fiber management tray 12 via the connector holders 14, 14a, although alternatives are possible.

Figure 13:
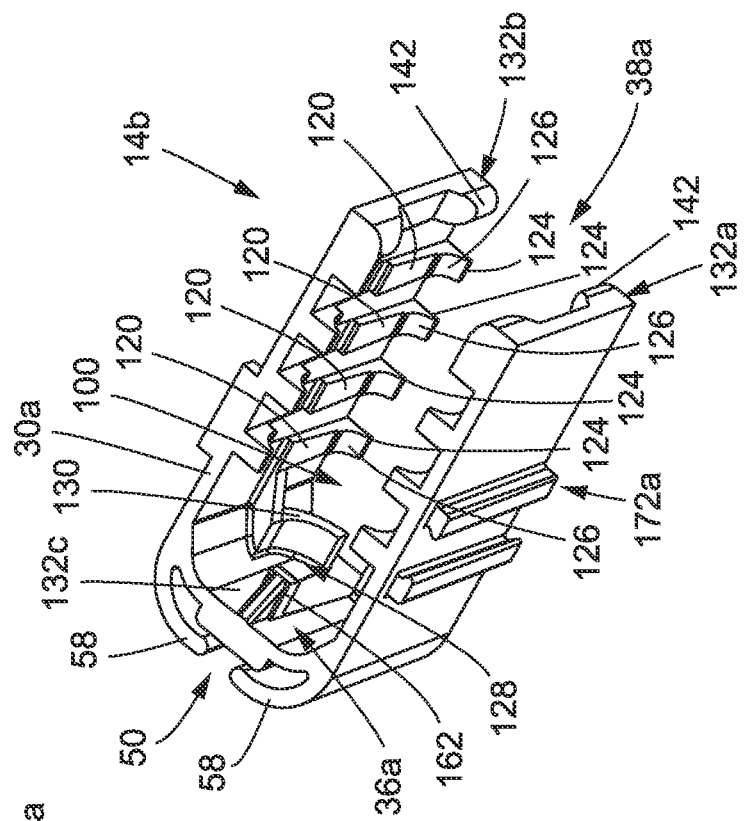
FIG. 13 is another perspective view of the connector holder of FIG. 11.
Figure 12:
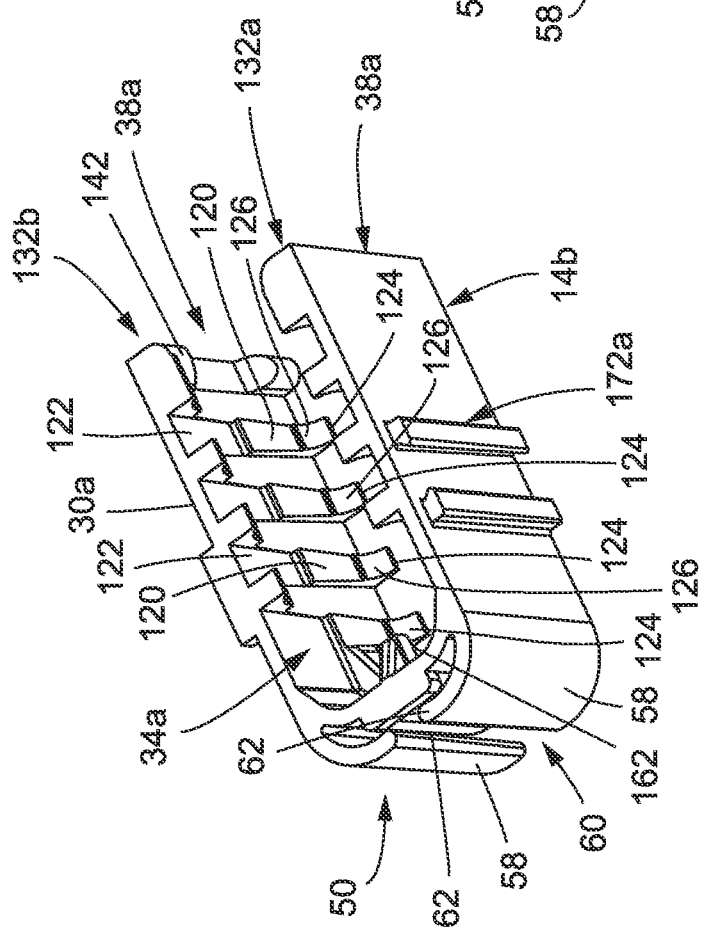
FIG. 12 is a perspective view of the connector holder of FIG. 11.
Figure 14:
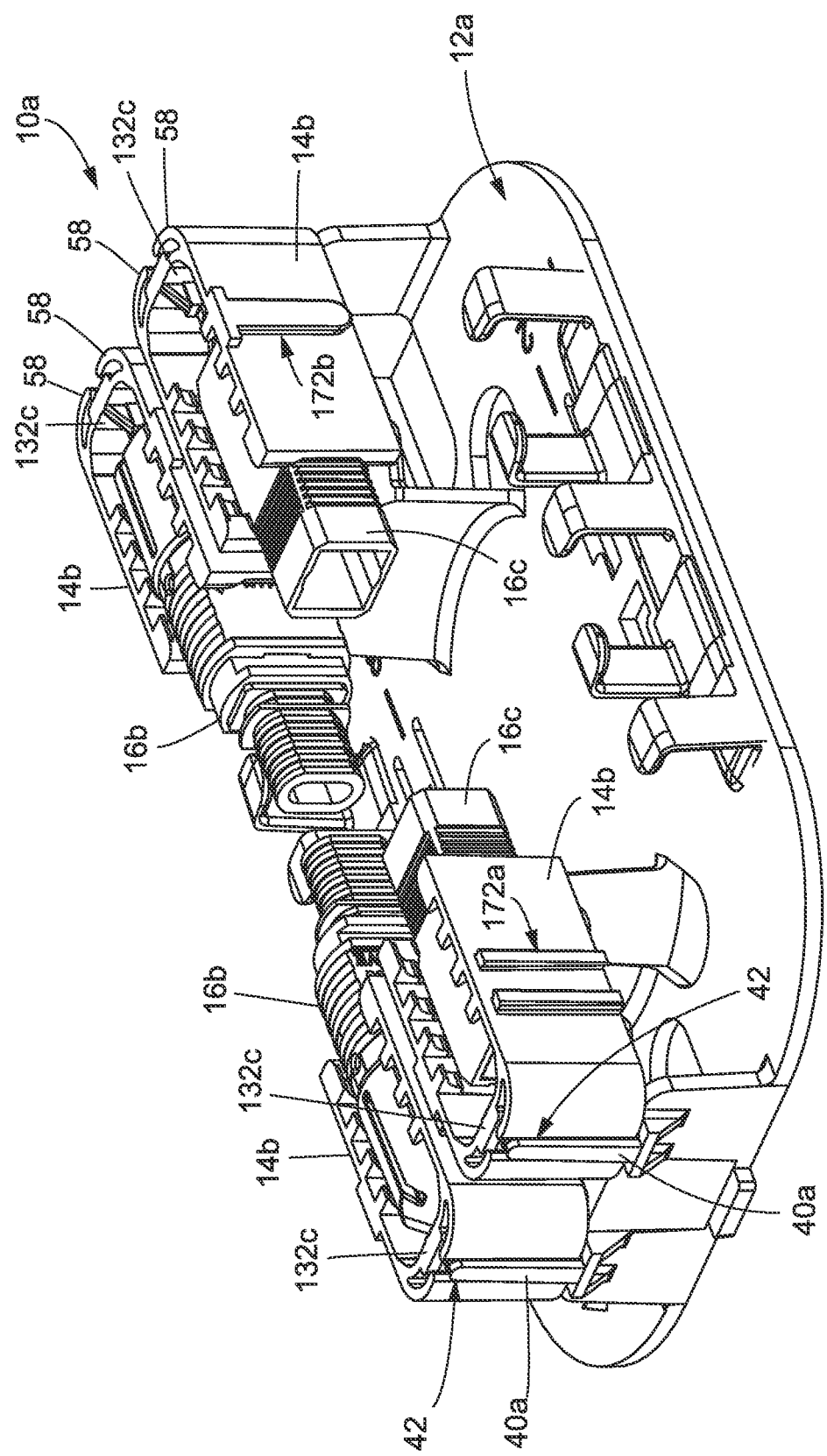
FIG. 14 is a perspective view of another example tray assembly including a plurality of connector holders mounted thereon in accordance with principles of the present disclosure.
Figure 15:
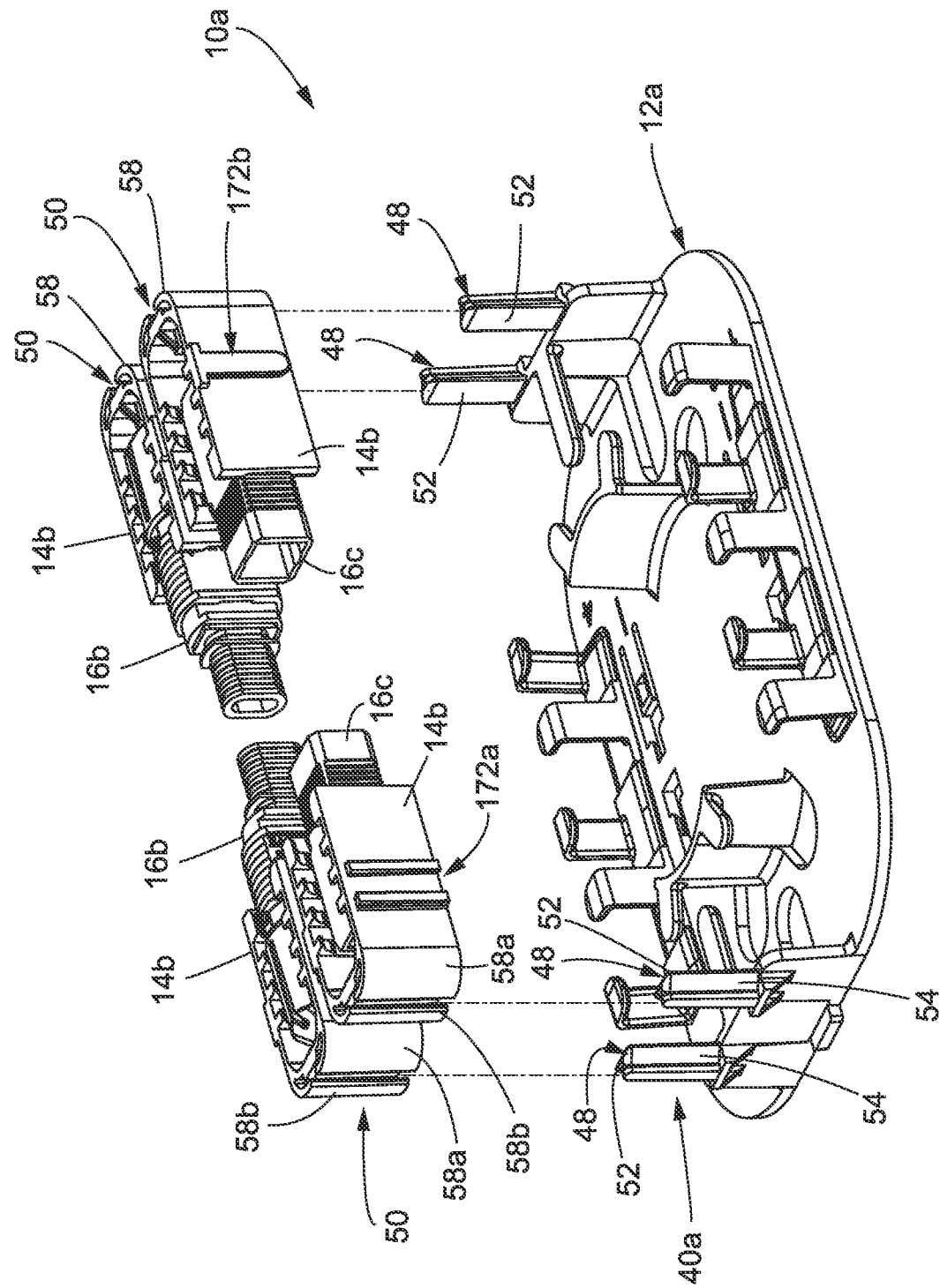
FIG. 15 is a perspective view of the example tray assembly shown in FIG. 14 with the connector holders exploded therefrom.
Figure 16:
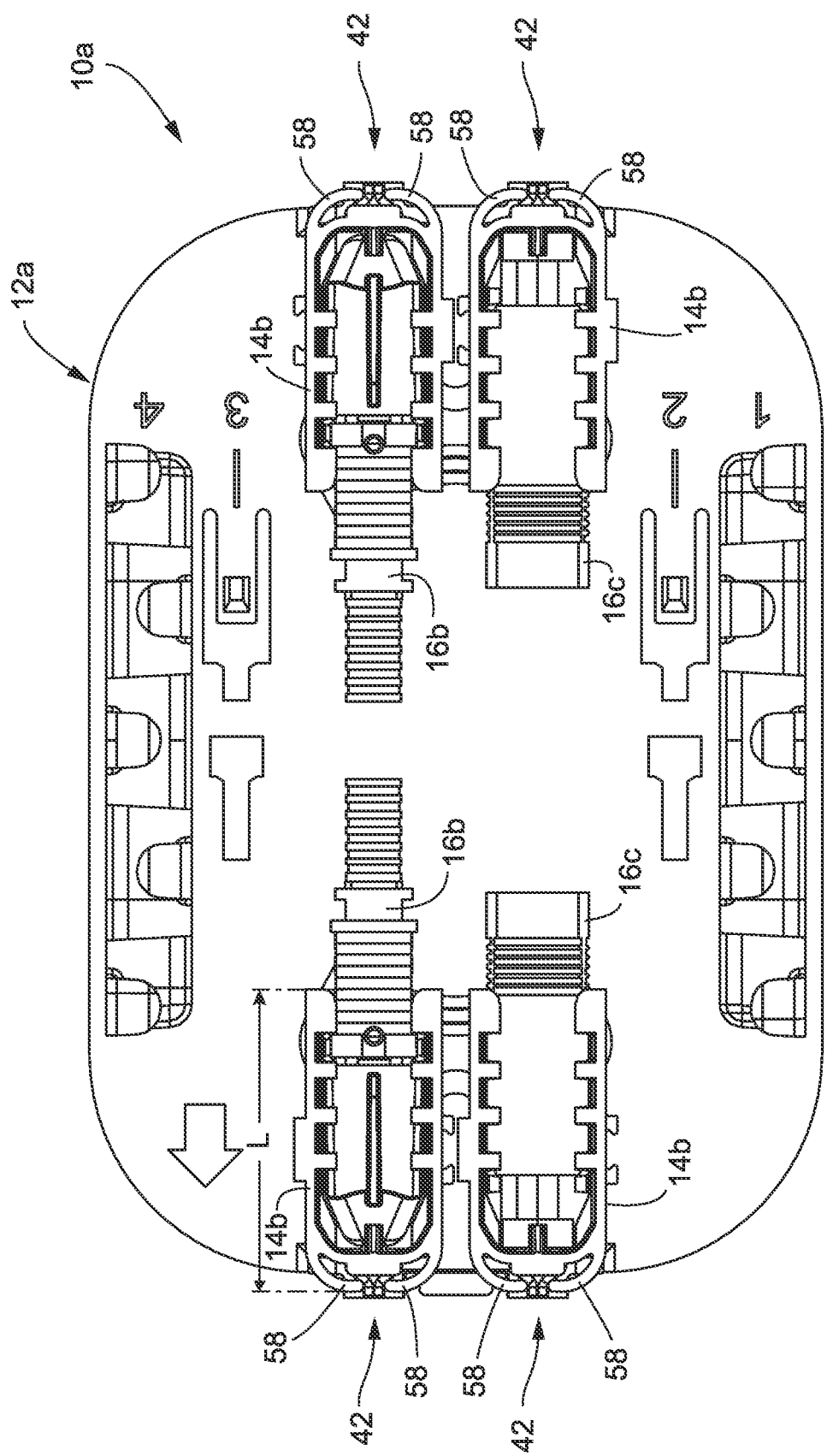
FIG. 16 is a top view of the tray assembly shown in FIG. 14.
Figure 17:
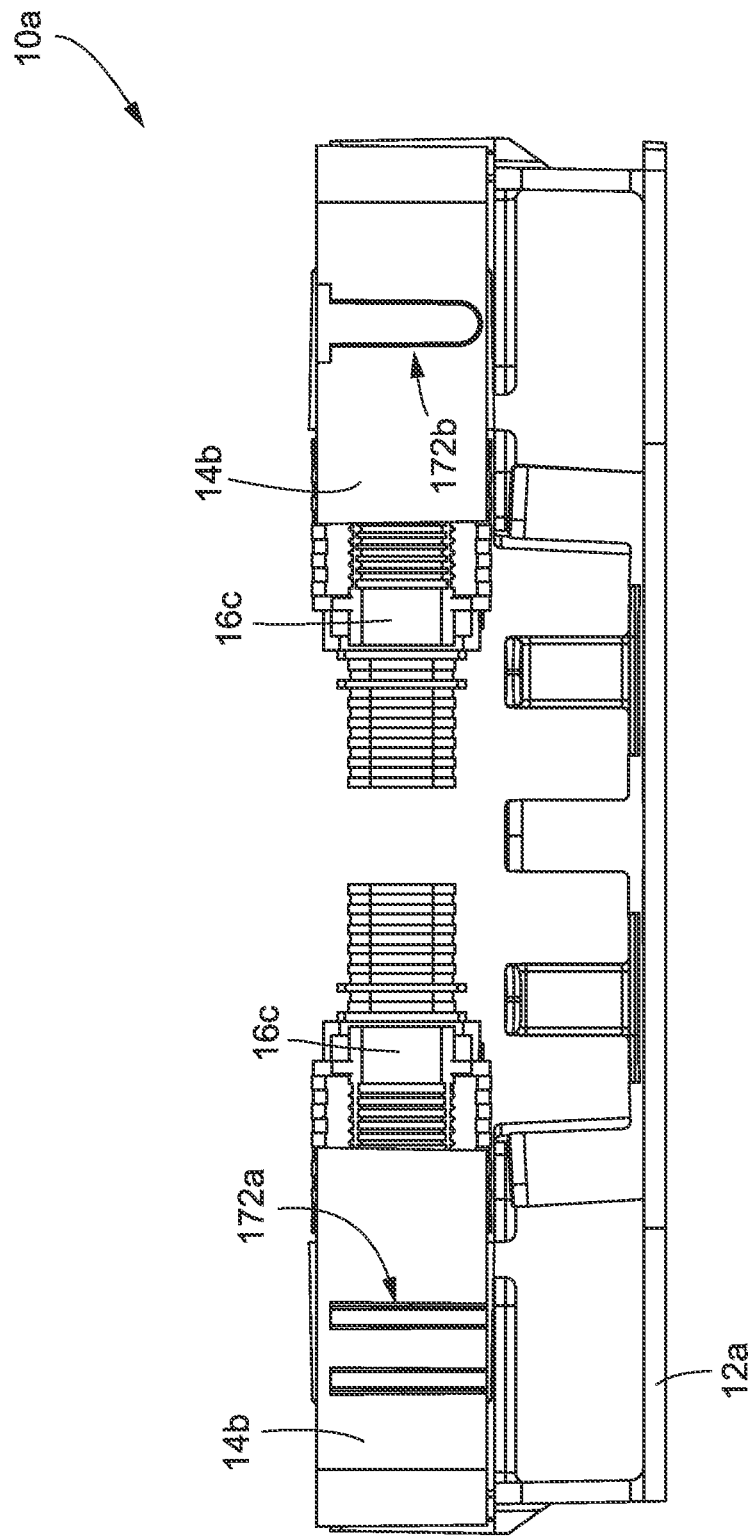
FIG. 17 is a side view of the tray assembly shown in FIG. 14.

Referring to FIGS. 11-13, another example connector holder 14b is depicted in accordance with the principles of the present disclosure. The connector holder 14b is configured to hold both a MPO style fiber optic connector 16b and a SC style fiber optic connector 16c. The connector holder 14b can be configured to receive both MPO and SC types so that there is no need for two different types of holders. In certain examples, the connector holder 14b can also hold LC type connectors. The MPO and SC type connectors 16b, 16c can be retained within the connector holder 14b (e.g., gripped, captured, interlocked or otherwise secured within the connector holder 14b). Unless stated otherwise, the features of the connector holder 14b are similar to the connector holders 14, 14a described above. For the sake of brevity, only those portions that differ from the connector holders 14, 14a illustrated in FIGS. 1-10 discussed above will be described in detail.

FIGS. 14-17 show the connector holder 14b attached to a mounting structure 40b using the coupling arrangement 42 to provide a detachable interlocking connection between the connector holder 14b and the mounting structure 40b on another example fiber management tray 12a. That is, the coupling arrangement 42 can be provided for releasably connecting the connector holder 14b to the mounting structure 40a as described above. It will be appreciated that the connector holders 14b can be used with any number of different types of telecommunications equipment such as trays, panels, racks, enclosures, hubs, frames or the like.

As depicted, the connector holder 14b is configured to hold both MPO and SC style fiber optic connectors 16b, 16c on the fiber management tray 12a. The connector holder 14b has a length L (see FIG. 16) that is configured to receive at least half a length $L_1$, $L_2$ (see FIG. 19 and FIG. 23) of the connector body of the SC, MPO style fiber optic connectors 16c, 16b, respectively. In certain examples, the length L of the connector holder 14b is sufficient to receive about over half of the length $L_1$, $L_2$ of the connector body of the SC, MPO style fiber optic connectors 16c, 16b, respectively. Preferably, the length L of the connector holder 14b is sufficient to receive about ¾ the length $L_1$, $L_2$ of the connector body of the SC, MPO style fiber optic connectors 16c, 16b, respectively.

Turning again to FIGS. 12-14, the connector holder 14b includes a housing 30b with a first side wall 132a, a second side wall 132b, and an end wall 132c that may extend between the first and second side walls 132a, 132b. The housing 30b can define a receptacle 34a for receiving either one of the fiber optic connectors 16b, 16c. The connector holder 14b can support the SC, MPO style fiber optic connectors 16c, 16b such that they can be retained within the receptacle 34a without risk of falling out. The receptacle 34a may have a closed end 36a formed by the end wall 132c and an opposite, open end 38a such that the fiber optic connectors 16b, 16c are inserted into the receptacle 34a from the open end 38a.

The receptacle 34a defines an open bottom 100 between the first and second side walls 132a, 132b, although alternatives are possible. The first and second side walls 132a, 132b can be flexible to allow for insertion of the fiber optic connectors 16b, 16c. An interference fit or frictional fit can be generated by a plurality of interior rails 120 integrated with the first and second side walls 132a, 132b of the receptacle 34b. The plurality of interior rails 120 can extend in a vertical direction along a partial interior surface 122 of the first and second side walls 132a, 132b. For example, the plurality of interior rails 120 may extend halfway along the interior surface 122 of the first and second side walls 132a, 132b, respectively.

The housing 30b of the connector holder 14b can be sized to allow either one of the fiber optic connectors 16b, 16c to reside by friction fit within the receptacle 34b. The plurality of interior rails 120 of the first and second side walls 132a, 132b can aid in keeping the fiber optic connectors 16b, 16c from moving laterally within the receptacle 34b of the housing 30b. The plurality of interior rails 120 can frictionally engage the sides of the connector body 140 when either one of the fiber optic connectors 16b, 16c is retained within the receptacle 34b.

The connector holder 14b can also include lower and upper retention tabs 124, 136 that are integrated with the first and second side walls 132a, 132b and project into the receptacle 34b. For example, the lower and upper retention tabs 124, 136 of the first side wall 132a can extend in a direction that opposes the lower and upper retention tabs 124, 136 of the second side wall 132b. The lower and upper retention tabs 124, 136 generally extend in a direction perpendicular to the plurality of interior rails 120. When one of the first and second fiber optic connectors 16b, 16c is mounted within the receptacle 34b of the connector holder 14b, the lower and upper retention tabs 124, 136 respectively oppose the lower and upper sides of the connector body to limit or restrict downward and upward movement of the connector body 140 relative to the connector holder 14b. As such, the connector body 140 can be captured between the lower and upper retention tabs 124, 136 to prevent the fiber optic connectors 16b, 16c from falling out of the connector holder 14b.

When a connector is mounted within the receptacle 34b of the connector holder 14b, the connectors can also engage inclined surfaces 126, 134 of the lower and upper retention tabs 124, 136 to help prevent vertical escape of the respective fiber optic connector 16b, 16c from the receptacle 34b. That is, contoured surfaces 138 of the lower and upper retention tabs 124, 136 are adapted to oppose and engage the respective fiber optic connector 16b, 16c when the respective fiber optic connector 16b, 16c is retained in the receptacle 34b.

The first and second side walls 132a, 132b preferably have a resilient construction and can be flexed along their lengths starting at locations adjacent the end wall 132c to move the first and second side walls 132a, 132b apart from one another to accommodate receipt of one of the fiber optic connectors 16b, 16c. With the first and second side walls 132a, 132b flexed apart, the respective fiber optic connectors 16b, 16c can be axially inserted into the receptacle 34b or can be loaded into the receptacle 34b through the open top side of the receptacle 34b. Upon release of the first and second side walls 132a, 132b, the first and second side walls 132a, 132b resiliently return to a retaining position in which the respective fiber optic connector 16b, 16c is captured within the receptacle 34b.

Figure 18:
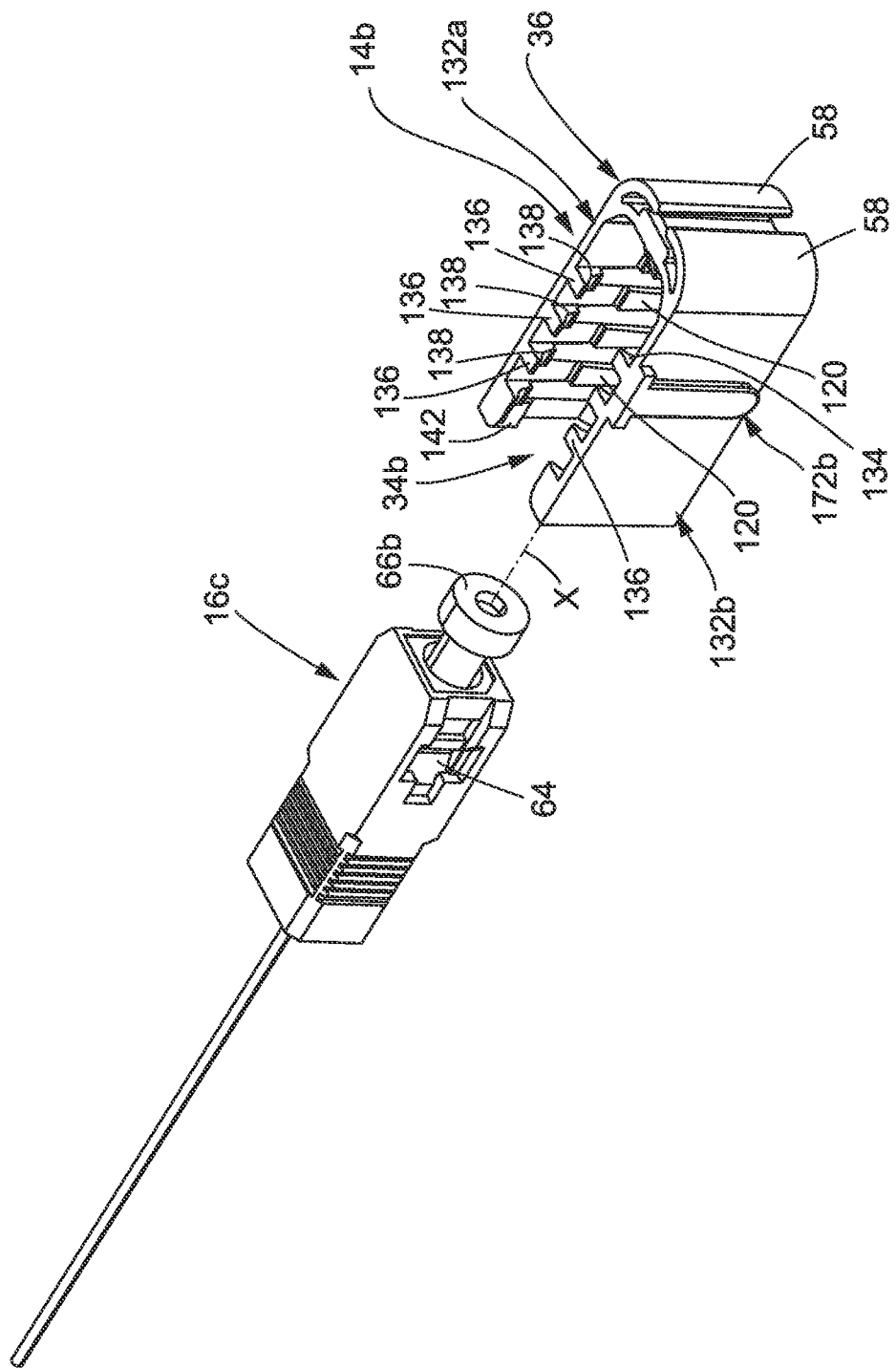
FIG. 18 is a perspective view of the SC type connector prior to insertion into the connector holder of FIG. 12.
Figure 19:
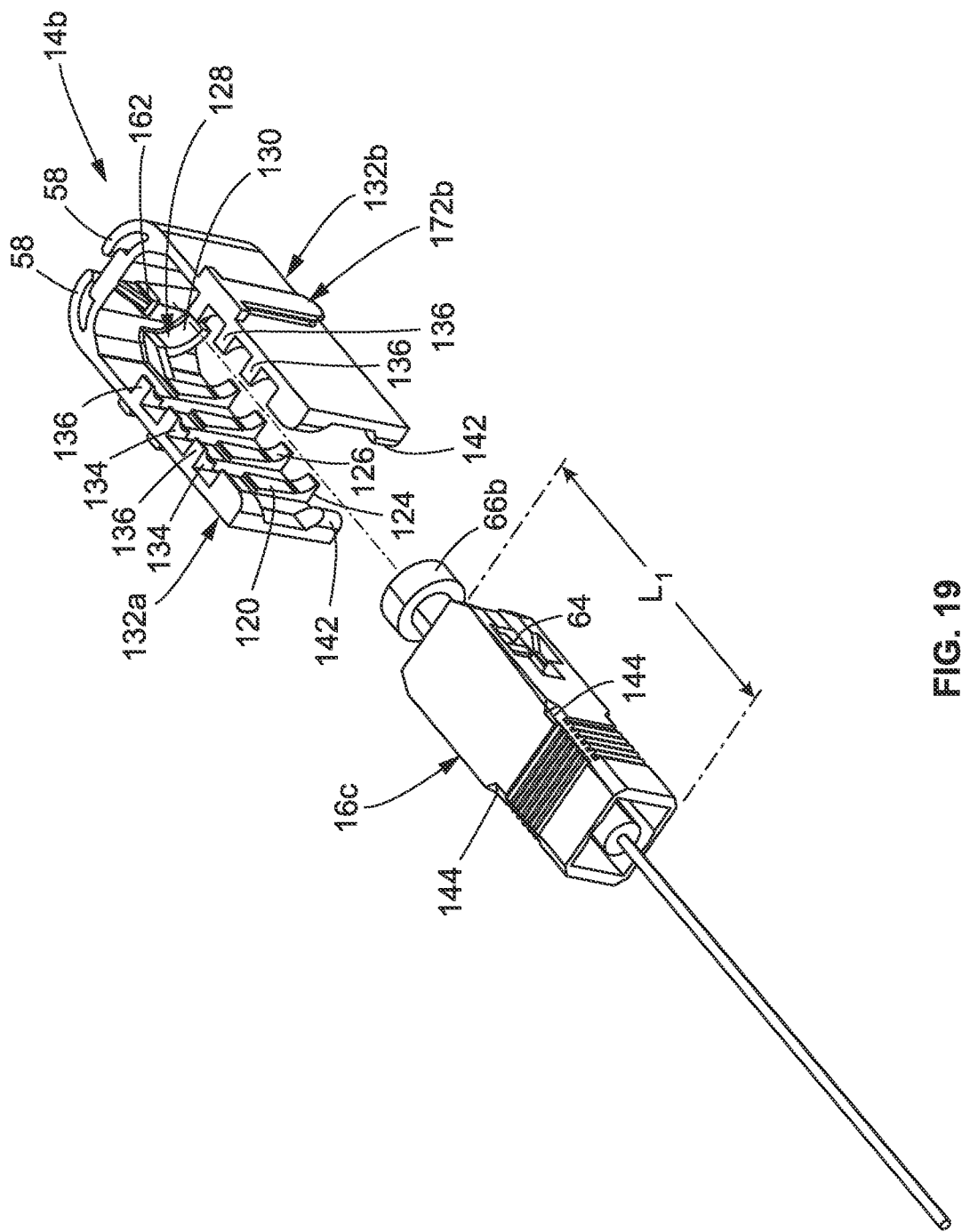
FIG. 19 is another perspective view of the SC type connector prior to insertion into the connector holder of FIG. 12.
Figure 21:
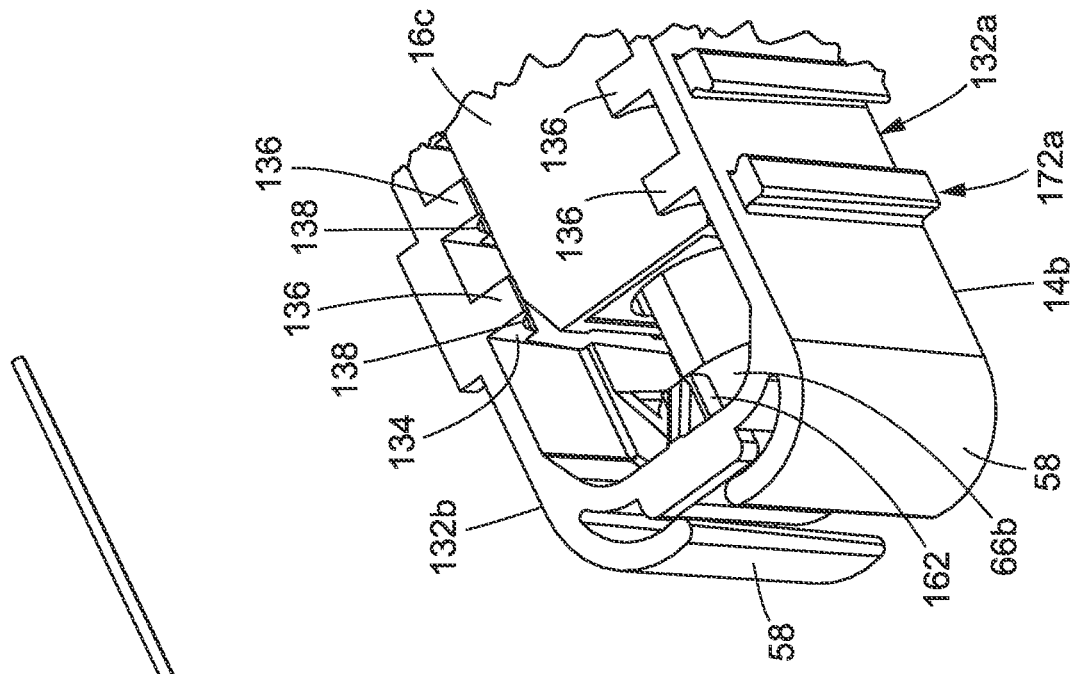
FIG. 21 is an enlarged view of a portion the SC type connector mounted in the connector holder of FIG. 20.
Figure 20:
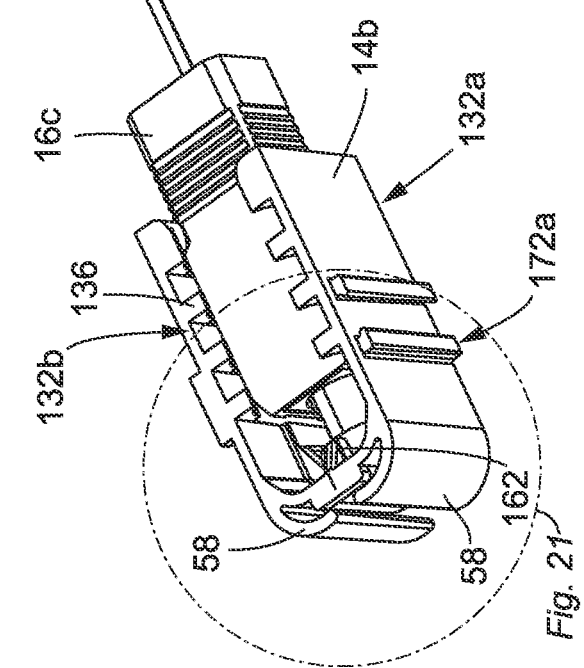
FIG. 20 is a perspective view showing the SC type connector mounted in the connector holder in accordance with the principles of the present disclosure.

Referring to FIGS. 18-19, the fiber optic connector 16c is shown prior to insertion into the connector holder 14b. The fiber optic connector 16c can be moved along the direction X until inserted into the receptacle 34b as shown in FIGS. 20-21 to be temporarily held therein.

The receptacle 34b of the connector holder 14b is capable of receiving and holding the fiber optic connector 16c while a dust cap 66b is mounted over a ferrule of the fiber optic connector 16c. When the fiber optic connector 16c is mounted in the connector holder 14b, the dust cap 66b can be captured in a pocket 128 defined by a structure 130 provided at the closed end 36 of the receptacle 34b. When the dust cap 66b is positioned within the pocket 128, a retention member 132 located at the closed end 36 of the receptacle 34b can engage a surface of the dust cap 66b to help prevent vertical movement of the fiber optic connector 16c.

The connector holder 14b may also include end stops 142 on the first and second side walls 132a, 132b at the open end 38 to prevent the respective fiber optic connector 16b, 16c from being removed axially from the receptacle 34b once the fiber optic connector 16b, 16c is secured in the receptacle 34b with the first and second side walls 132a, 132b in the retaining position. The end stops 142 may correspond with surfaces 144 on the connector body 140 to help prevent backward motion of the fiber optic connector 16c from the receptacle 34b.

Figure 22:
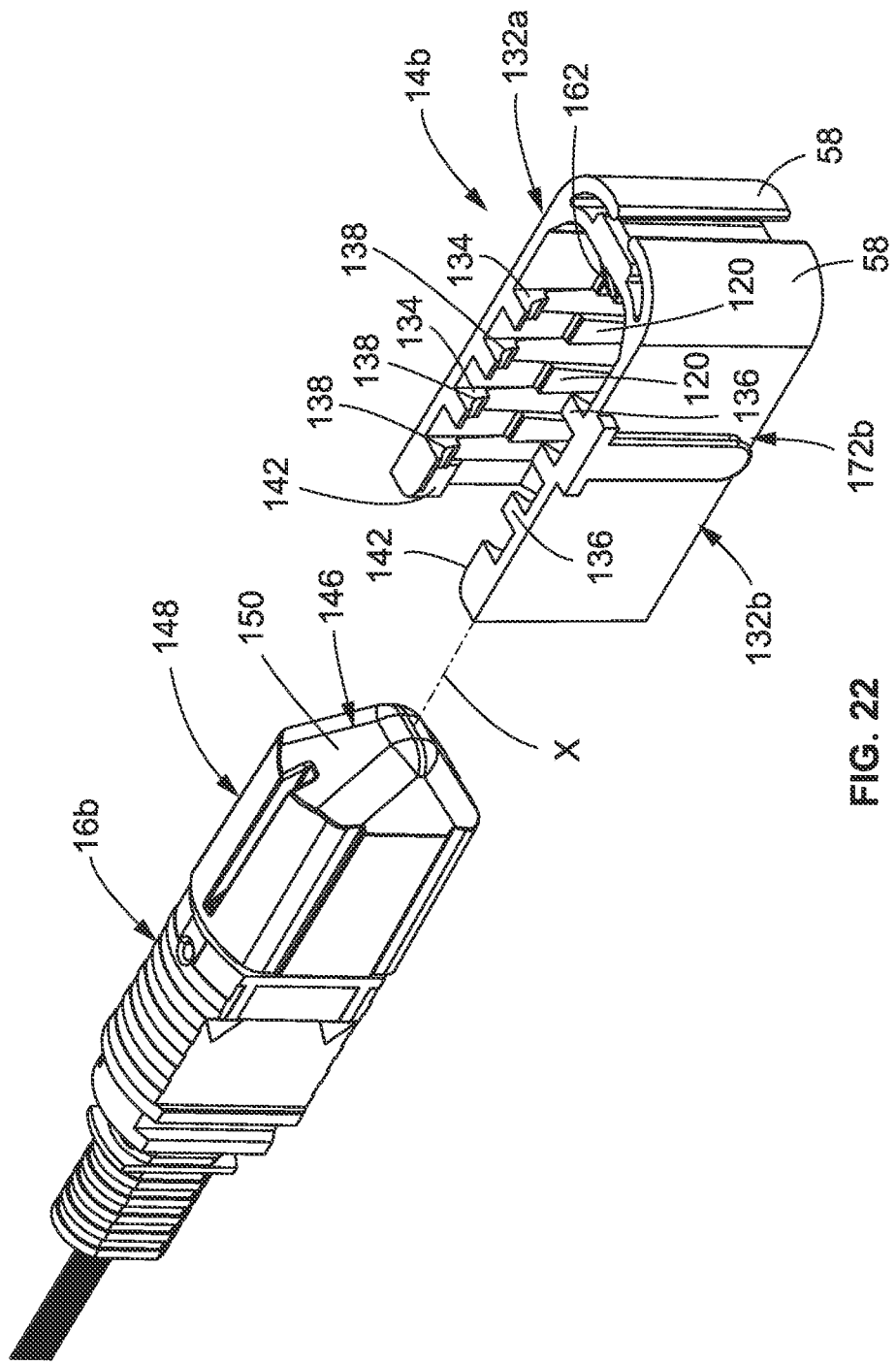
FIG. 22 is a perspective view of the MPO type connector prior to insertion into the connector holder of FIG. 12.
Figure 23:
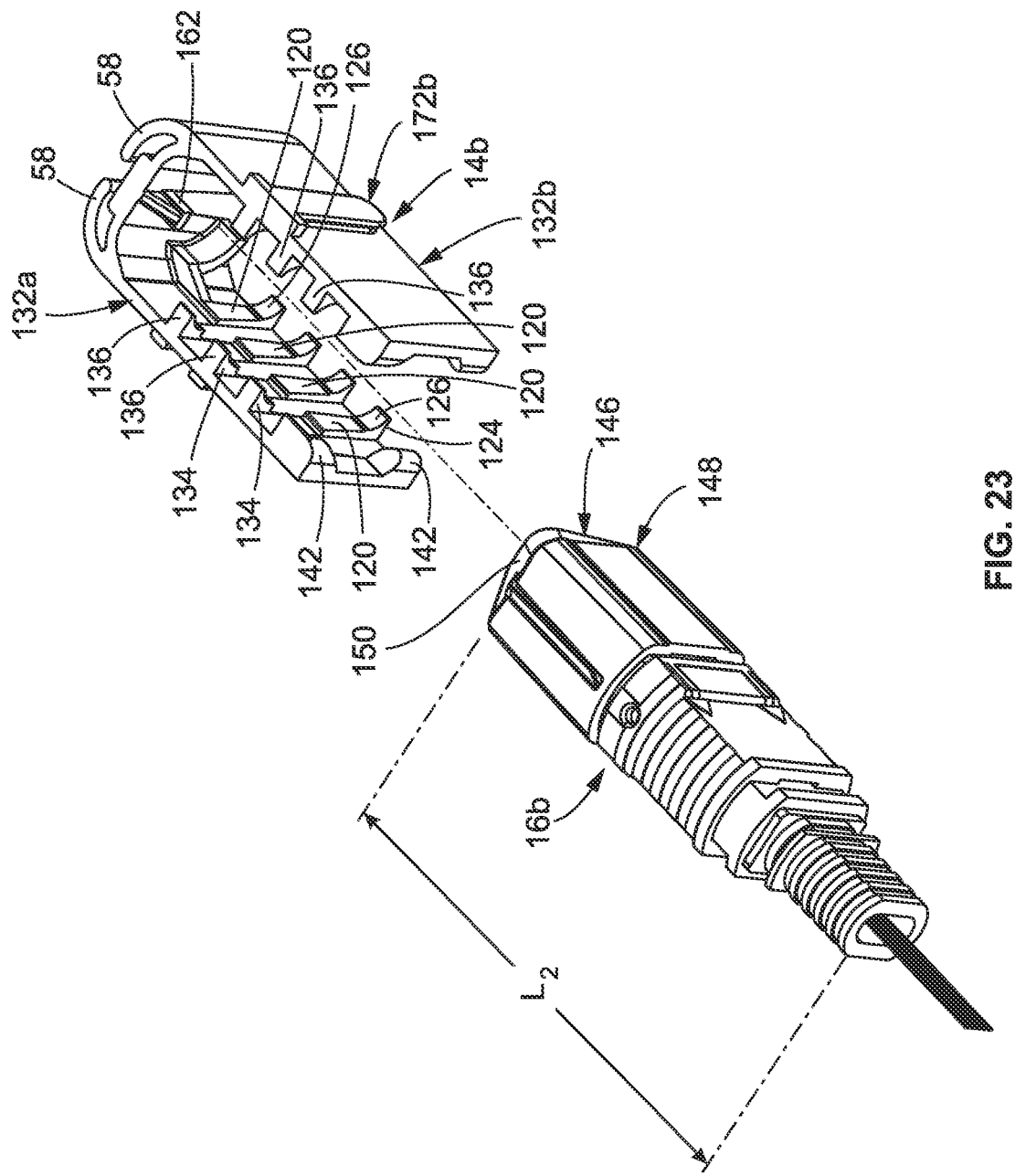
FIG. 23 is another perspective view of the MPO type connector prior to insertion into the connector holder of FIG. 12.
Figure 27:
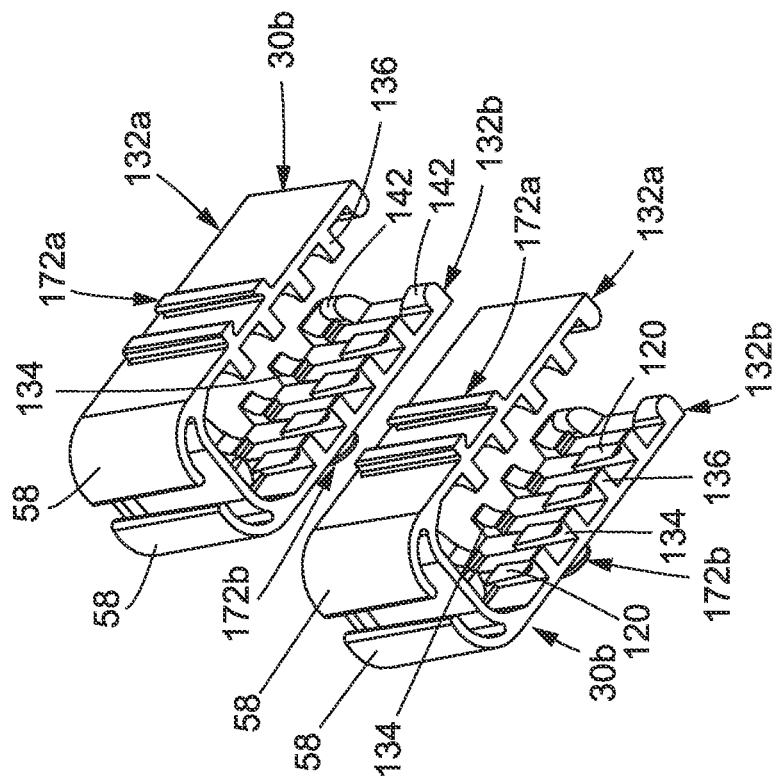
FIGS. 26-27 are perspective views of the connector holders prior to being connected together in a ganged relationship in accordance with the principles of the present disclosure.
Figure 26:
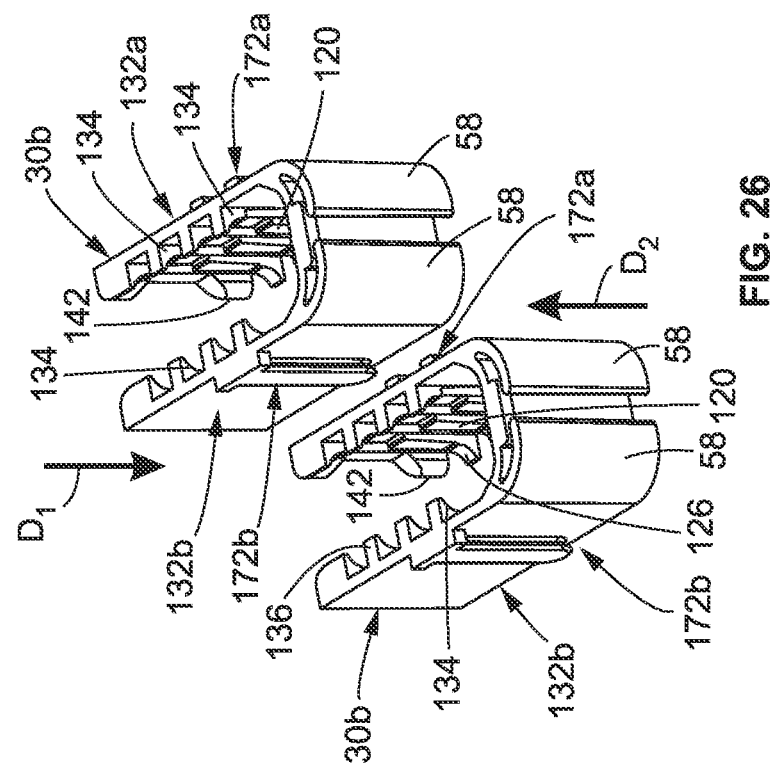

Referring to FIGS. 22-23, the fiber optic connector 16b is shown prior to insertion into the connector holder 14b. The fiber optic connector 16b can be moved along the direction X until inserted into the receptacle 34b as shown in FIGS. 24-25 to be temporarily held therein.

The fiber optic connector 16b has a dust cap 148 with a nose portion 146. When the fiber optic connector 16b is inserted into the receptacle 34b, the nose portion 146 of a dust cap 148 mounted on the fiber optic connector 16b can be received in the pocket 128. As such, the retention member 132 can engage a top surface 150 of the nose portion 146 to help limit vertical movement of the fiber optic connector 16b out of the connector holder 14b.

Referring to FIGS. 26-29, the connector holder 14b can include engagement structures 172a, 172b on the respective first and second side walls 132a, 132b of the housing 30b for directly coupling a plurality of housings 30b of the connector holder 14b together in a chain or side-by-side arrangement. That is, the engagement structures 172a, 172b allow a plurality of housings 30b to be slidably attached together in a row in a ganged relationship. As such, the connector holders 14b can be easily and quickly joined together by unskilled persons without needing any tools.

In certain examples, the first and second side walls 132a, 132b of the housing 30b can each include one of a tongue portion that corresponds to a male feature and a groove portion that corresponds to a female feature. In certain examples, the tongue portion includes a dovetail tongue portion and the groove portion includes a dovetail groove portion. The tongue and tongue groove can form a vertical joint between the respective first and second side walls 132a, 132b contact surfaces.

Figure 29:
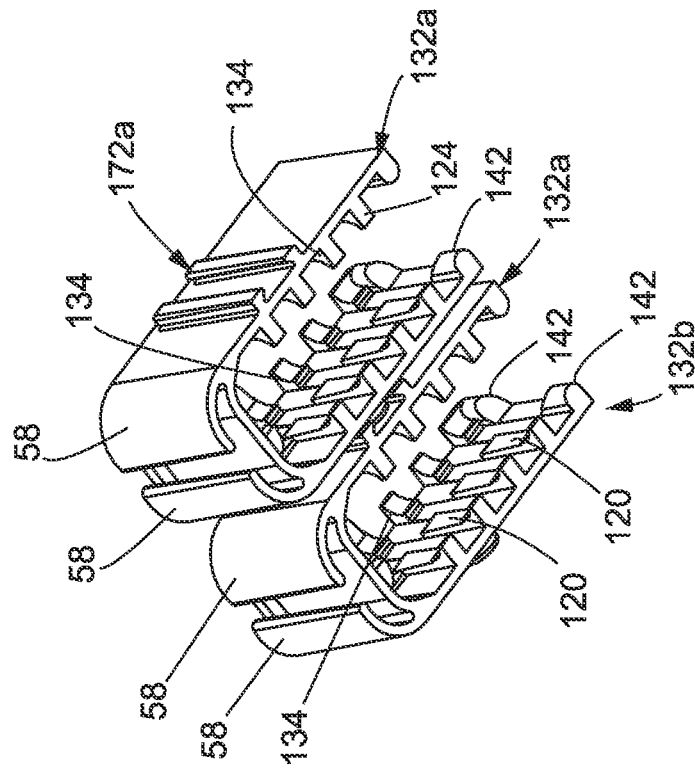
FIGS. 28-29 are perspective views of the connector holders connected together in a ganged relationship in accordance with the principles of the present disclosure.
Figure 28:
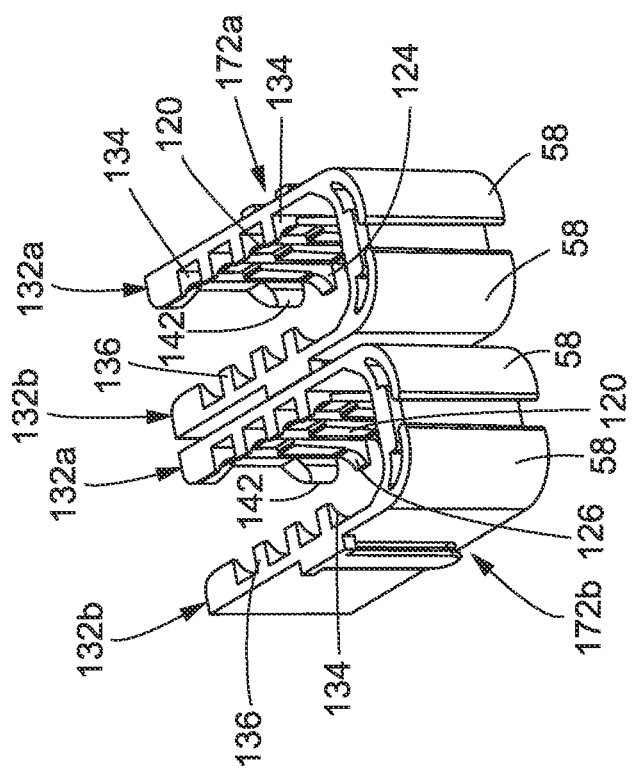

When a plurality of connector holders 14b are directly coupled together in a side-by-side relationship as shown in FIGS. 28-29, one of a dovetail tongue portion and dovetail groove portion is coupled to a mating one of a dovetail tongue portion and dovetail groove portion of an adjoining side of an adjacently disposed connector holder 14b to establish a dovetail connection therebetween. That is, the groove portion can receive the tongue portion of an adjacent connector holder 14b to directly couple the connector holders 14b with an adjacent connector holder 14b. The connector holders 14b can be joined or mated together in the direction $D_1$ (see FIG. 26) and the direction $D_2$ (See FIG. 26) along their first and second side walls 132a, 132b such that the tongue portion enters or engages the grove portion. As such, both the SC style fiber optic connector 16b and the MPO style fiber optic connector 16c can be joined via one connector holder 14b as desired. In certain examples, the two types of connectors can be mounted together on a structure such as the fiber management tray 12a via the connector holder 14b.

In certain examples, the engagement structures 172a, 172b allow adjacent connector holders 14b to be directly coupled together in a side-by-side arrangement on the fiber management tray 12a. In certain examples, the engagement structures 172a, 172b may be integrated with the housing 30b, although alternatives are possible. In certain examples, the engagement structures 172a, 172b may be coupled with the housing 30b. It will be appreciated that connector holders corresponding to different types of fiber optic connectors may be chained together.

Another aspect of the present disclosure relates to a method of assembling a fiber optic connector on a tray. The method can include steps of 1) inserting a fiber optic connector into a connector holder; and 2) staging the fiber optic connector on the tray by attaching the connector holder to a post.

Another aspect of the present disclosure relates to a method of assembling a fiber optic connector on a tray. The method can include steps of 1) pre-mounting connector holders on a post of a tray, respectively to define connector staging locations, and 2) subsequently loading fiber optic connectors into respective connector holders.

A further aspect of the present disclosure relates to a method of forming a chain of connector holders together. The method can include steps of 1) mating a male feature of a connector holder directly with a female feature of another adjacent connector holder such that a plurality of connector holders can be connected together in a chain or side-by-side relationship; and 2) mounting the plurality of connector holders in a structure, such as a tray. In certain examples, the connector holders can include different style fiber optic connectors.

From the forgoing detailed description, it will be evident that modifications and variations can be made without departing from the spirit and scope of the disclosure.

What is claimed is:

1. A connector holder comprising:
   first and second side walls that together define a receptacle for receiving a fiber optic connector, the receptacle having a closed end and an opposite, open end; and
   a coupler positioned at the closed end of the receptacle, the coupler being configured to mate with a coupling feature of another structure, wherein the coupler includes tabs that define a groove feature for receiving the structure and the structure includes a tongue feature that mounts in the groove feature of the tabs, wherein the tabs provide for an anti-rotation feature about the tongue.

2. The connector holder of claim 1, wherein the structure is a post.

3. The connector holder of claim 2, wherein the post is configured to mount on a tray.

4. The connector holder of claim 2, wherein when the coupler mates with the coupling feature of the post, a sliding interface is formed.

5. The connector holder of claim 1, further comprising a coupling interface that includes a female interlock feature and a male interlock feature.

6. The connector holder of claim 5, wherein the female interlock feature is configured to receive the male interlock feature of an adjacent connector holder.

7. The connector holder of claim 5, wherein the male and female interlock features are configured for directly coupling together a plurality of connector holders in a side-by-side arrangement on a tray.

8. The connector holder of claim 7, wherein the tray is adapted to mount in a multi-service terminal.

* * * * *